(12) United States Patent
Stewart et al.

(10) Patent No.: US 10,318,934 B2
(45) Date of Patent: Jun. 11, 2019

(54) ELECTRONIC PAYMENT AND AUTHENTICATION SYSTEM WITH DEBIT AND IDENTIFICATION DATA VERIFICATION AND ELECTRONIC CHECK CAPABILITIES

(71) Applicant: eFunds Corporation, Jacksonville, FL (US)

(72) Inventors: Whitney Hilton Stewart, Cave Creek, AZ (US); Matthew Lacey Petersen, St. Paul, MN (US); Brian John Gallmeier, Lino Lakes, MN (US); Teresa Marie Crews, Shoreview, MN (US); Mark Andrew Nipe, Lino Lakes, MN (US); James Michael Haire, Eagan, MN (US); Robert Lawrence Hill, Mill Creek, WA (US); Michael Richard Bates, Kenmore, WA (US)

(73) Assignee: eFunds Corporation, Milwaukee, WI (US)

( * ) Notice: Subject to any disclaimer, the term of this patent is extended or adjusted under 35 U.S.C. 154(b) by 165 days.

(21) Appl. No.: 13/776,564

(22) Filed: Feb. 25, 2013

(65) Prior Publication Data
US 2013/0173463 A1   Jul. 4, 2013

Related U.S. Application Data

(60) Continuation of application No. 13/245,325, filed on Sep. 26, 2011, now Pat. No. 8,401,966, which is a
(Continued)

(51) Int. Cl.
G06Q 30/04   (2012.01)
G06Q 20/04   (2012.01)
(Continued)

(52) U.S. Cl.
CPC ......... G06Q 20/0425 (2013.01); G06Q 20/04 (2013.01); G06Q 20/085 (2013.01);
(Continued)

(58) Field of Classification Search
USPC ............................................................ 705/40
See application file for complete search history.

(56) References Cited

U.S. PATENT DOCUMENTS

| 4,891,503 A | 1/1990 | Jewell |
| 5,231,570 A | 7/1993 | Lee |

(Continued)

OTHER PUBLICATIONS

"Making Payments on the Internet", Business Review (Federal Reserve Bank of Philadelphia), James J. McAndrews. pp. 3-14, Jan./Feb. 1997.

(Continued)

*Primary Examiner* — Hai Tran
(74) *Attorney, Agent, or Firm* — Finnegan, Henderson, Farabow, Garrett & Dunner LLP

(57) ABSTRACT

An electronic payment and authentication system that includes features to verify the authenticity of a payer, validate debit data, and facilitate debit (as opposed to credit) payment transactions. The electronic payment system allows a consumer to purchase items and services via a network while utilizing a debit transaction. The invention provides merchants with the ability to verify the identity of the consumer, determine if the consumer is a good debit transaction risk, and retrieve debit data associated with a particular consumer.

18 Claims, 20 Drawing Sheets

Related U.S. Application Data continuation of application No. 12/785,879, filed on May 24, 2010, now Pat. No. 8,060,441, which is a division of application No. 10/082,677, filed on Feb. 25, 2002, now Pat. No. 7,752,132.

(60) Provisional application No. 60/271,156, filed on Feb. 23, 2001.

(51) Int. Cl.

| | | |
|---|---|---|
| *G06Q 20/08* | (2012.01) | |
| *G06Q 20/10* | (2012.01) | |
| *G06Q 20/28* | (2012.01) | |
| *G06Q 20/40* | (2012.01) | |
| *G06Q 40/00* | (2012.01) | |
| *G06Q 40/02* | (2012.01) | |

(52) U.S. Cl.
CPC ........... *G06Q 20/10* (2013.01); *G06Q 20/102* (2013.01); *G06Q 20/108* (2013.01); *G06Q 20/28* (2013.01); *G06Q 20/40* (2013.01); *G06Q 20/401* (2013.01); *G06Q 30/04* (2013.01); *G06Q 40/00* (2013.01); *G06Q 40/025* (2013.01)

(56) References Cited

U.S. PATENT DOCUMENTS

| | | |
|---|---|---|
| 5,239,462 A | 8/1993 | Jones et al. |
| 5,274,547 A | 12/1993 | Zoffel et al. |
| 5,303,149 A | 4/1994 | Janigian |
| 5,606,690 A | 2/1997 | Hunter et al. |
| 5,659,731 A | 8/1997 | Gustafson |
| 5,761,389 A | 6/1998 | Maeda et al. |
| 5,765,144 A | 6/1998 | Larche et al. |
| 5,774,882 A | 6/1998 | Keen et al. |
| 5,797,133 A | 8/1998 | Jones et al. |
| 5,819,226 A | 10/1998 | Gopinathan et al. |
| 5,870,721 A | 2/1999 | Norris |
| 5,878,403 A | 3/1999 | DeFrancesco et al. |
| 5,946,669 A | 8/1999 | Polk |
| 5,995,626 A | 11/1999 | Nishioka et al. |
| 6,018,723 A | 1/2000 | Siegel et al. |
| 6,026,398 A * | 2/2000 | Brown ............ G06F 17/30622 704/1 |
| 6,073,140 A | 6/2000 | Morgan et al. |
| 6,160,874 A | 12/2000 | Dickerman et al. |
| 6,289,322 B1 * | 9/2001 | Kitchen ................ G06Q 20/04 705/34 |
| 6,488,206 B1 | 12/2002 | Flaig et al. |
| 6,609,113 B1 | 8/2003 | O'Leary et al. |
| 7,058,600 B1 | 6/2006 | Comber et al. |
| 7,076,458 B2 | 7/2006 | Lawlor et al. |
| 8,060,441 B2 * | 11/2011 | Stewart et al. ................ 705/40 |
| 2002/0178112 A1 * | 11/2002 | Goeller ............... G06Q 20/042 705/39 |

OTHER PUBLICATIONS

EIC Search Report for U.S. Appl. No. 10/082,677 (dated Nov. 16, 2009).

* cited by examiner

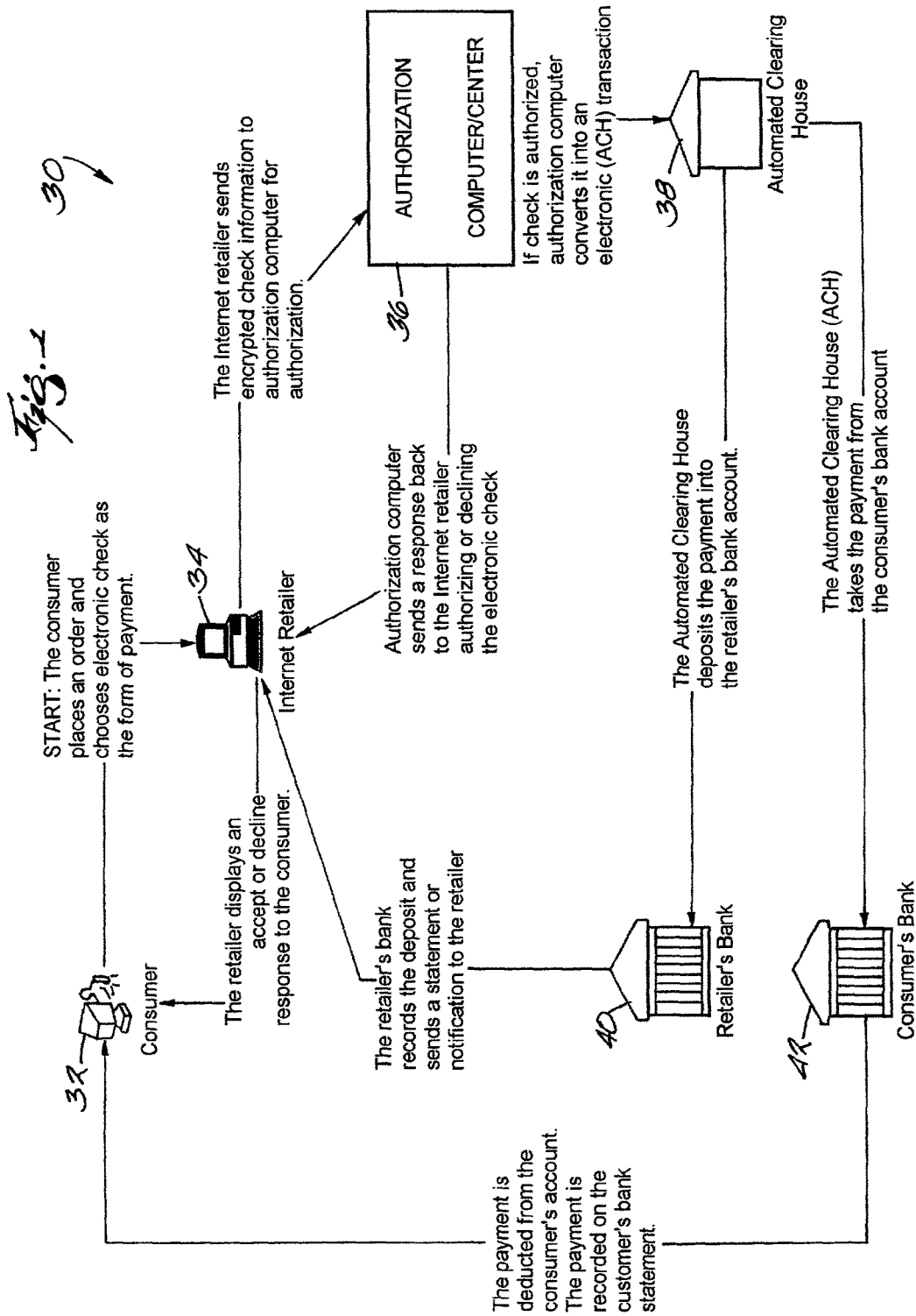

Gracious Table

Serving the kitchens of better chefs since 1975

| Kitchenware | Gifts | Recipes | Desserts | Fine Foods |

Check Out : Checking Account Information

① STEP Congratulations on choosing electronic check as your payment method. You will now be presented with a few easy steps for entering our checking account related information. Your first step is to enter our personal identification information that is required to process your payment. Most of this information should be entered as it appears on your checks.

40

42

Full Name: [matthew thompson]
Enter just your name, even if multiple names appear on your check.

Address: [1313 mockingbird ln]
[ ] (optional)

City: [fox point]
State: [WI ▽]
Zip/Postal Code: [53217]
Country: [United States ▽]
Phone Number: [555 555-5555]
Date of Birth: [June ▽] [1 ▽] [1970]
Driver's License Number: [K314-5667-777]
Driver's License State: [WI ▽]

| 50 | Presentation | 60 WEB Browser | 62 Client Software | 64 ARU/VRU | 66 Messaging (XML, Java, ISO) |
|---|---|---|---|---|---|

| 54 Product Drivers | 52 | 70 Electronic Check | 72 ID Verification | 74 Brokerage | 76 ACH Funding | 78 Future |
|---|---|---|---|---|---|---|

| 54 Application Components | 80 Check Auth | 82 ACH Funding | 84 Debit Bureau | 86 ATM Advanced Func. | 88 AP Maint. | 90 Data Navigator | 92 Internet Banking | 94 Fraud Case Mgmt. | 96 Tran Search | 98 Mail Discuss Cust Info Problems | 100 Interfaces to Partners | 102 Future |
|---|---|---|---|---|---|---|---|---|---|---|---|---|

| 56 Common Business Components | 110 Card Management | 112 Account Management | 114 Financial Transactions | 116 Cardholder Management | 118 Merchant Management | 120 Device Management (ATM/POS) |
|---|---|---|---|---|---|---|

| 58 Infrastructure | 130 Cobra/Settlement Engine/ Java Beans | 132 DBMS | 134 Message Oriented Middleware | 136 Security |
|---|---|---|---|---|

Fig. 2

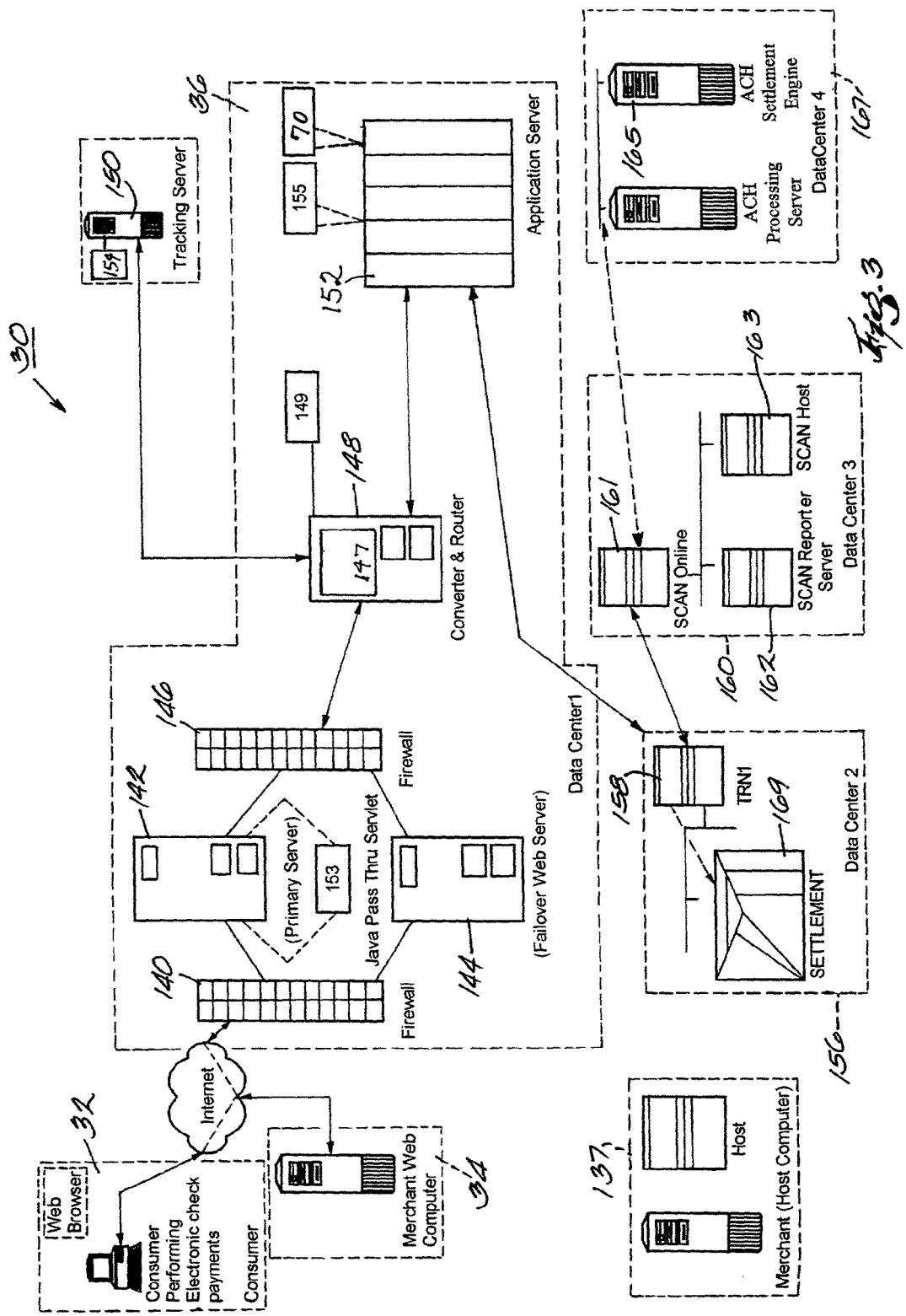

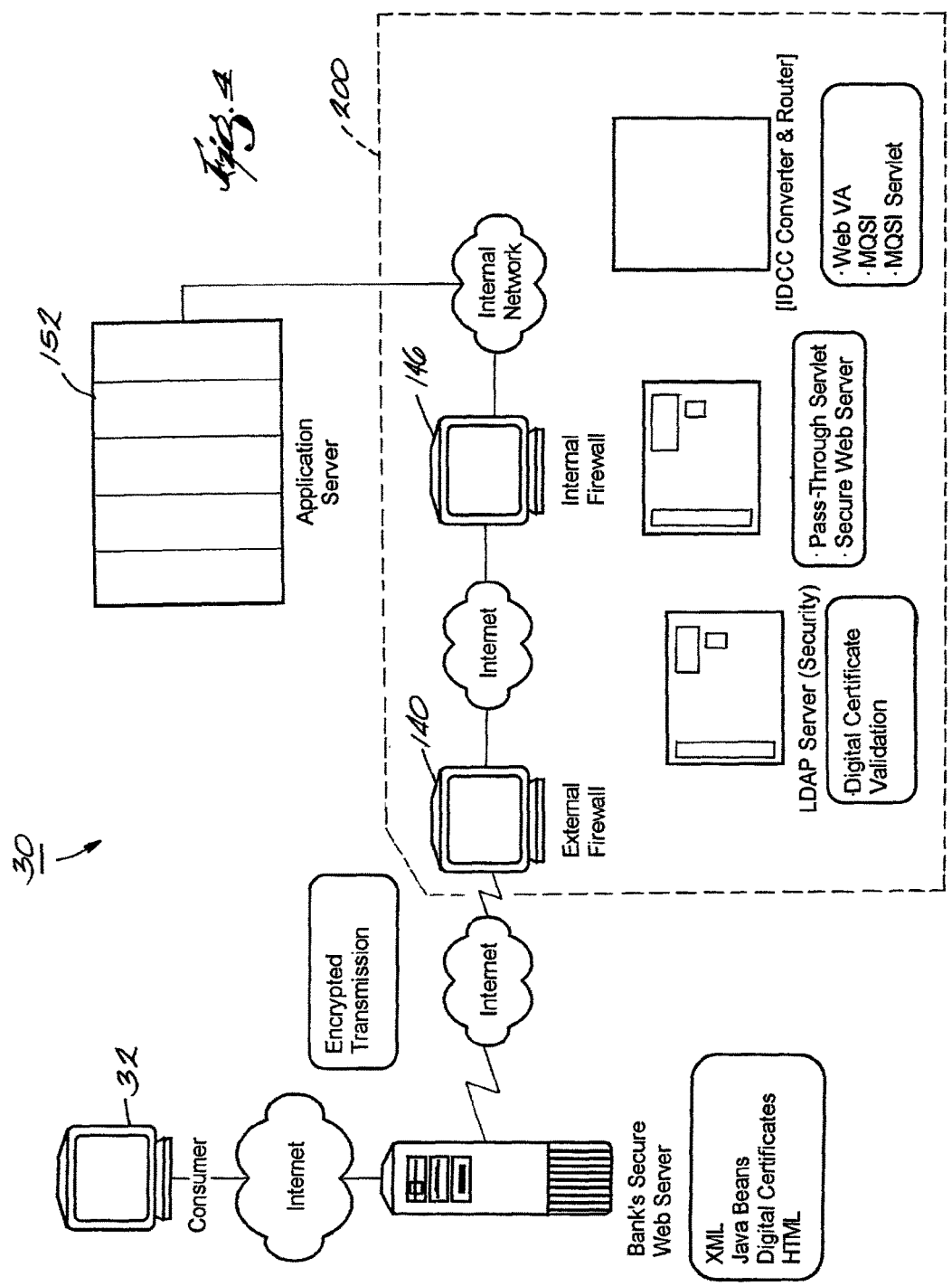

ELECTRONIC PAYMENT AND AUTHENTICATION SYSTEM WITH DEBIT AND IDENTIFICATION DATA VERIFICATION AND ELECTRONIC CHECK CAPABILITIES

This application is a continuation of U.S. patent application Ser. No. 13/245,325), filed Sep. 26, 2011 (allowed), which is a continuation application of U.S. patent application Ser. No. 12/785,879, filed May 24, 2010 (now U.S. Pat. No. 8,060,441), which is a divisional application of U.S. patent application Ser. No. 10/082,677, filed Feb. 25, 2002 (now U.S. Pat. No. 7,752,132), which claims priority to U.S. Provisional Patent Application No. 60/271,156 filed Feb. 23, 2001. This application claims the benefit of the preceding U.S. patent applications each of which is hereby incorporated by reference in its entirety.

BACKGROUND OF THE INVENTION

The present invention relates to electronic payment systems and, more particularly, to electronic payment systems that include features to verify the authenticity of a payer and to facilitate debit (as opposed to credit) payment transactions.

Anyone who has used an automated teller machine ("ATM") is familiar with a type of electronic debit transactions. When an ATM is used, an individual presents a card with a magnetic strip on which an account number is coded. The number is read by the ATM. If the individual inputs a personal identification number ("PIN") that matches the PIN read from the magnetic strip, the individual can engage in a transaction to withdraw money from the account. In a debit transaction, the user is merely transferring money out of his or her account. Often the ATM user receives cash, but in a debit purchase transaction (such as at a grocery store), funds are transferred from the user's account to the merchant's account.

Credit transactions involve a credit card issued to a user after he or she has made a credit application to a card issuer. Typically, a credit card is used to make purchases at participating merchants. The card issuer sends monthly statements to the user and the user is obligated to make payments to the card issuer. The card issuer is obligated to make payments to the participating merchant, but only if the transaction takes place under conditions that the card issuer has specified.

The growth of electronic commerce on the Internet has posed a number of challenges. Among these is the issue of how to make payments between remote and sometime anonymous buyers and sellers. A variety of payment mechanisms (such as electronic wallets, electronic cash, and others) have been proposed. However, credit cards have proved to be the dominant payment mechanism for Internet transactions, particularly in consumer transactions.

SUMMARY OF THE INVENTION

While the use of credit cards has supported the growth of electronic commerce, credit card transactions pose certain risks to merchants. Since an Internet transaction is conducted remotely, the transaction is viewed as a "card not present" or a "mail order/telephone order" ("MOTO") transaction. Unlike a face-to-face transaction where an imprint of a user's physical signature is obtained, if a cardholder disputes a charge in a MOTO transaction, the merchant, not the buyer, is liable for the charge. In addition, even though electronic signatures are legally recognized, the adoption of such signatures is in its infancy, and there is no widespread or uniform technology in use to reasonably support authentication of electronic signatures.

Another difficulty with credit cards is that they are not acceptable for all transactions. For example, most brokerage firms do not accept credit card payments, thereby requiring the consumer to either send a paper check or utilize a wire transfer to transfer money to the brokerage firm. This process can delay transactions the consumer wishes to perform, and result in a loss of consumer goodwill.

Another difficulty with credit cards is that some individuals do not possess credit cards at all, and other consumers only possess credit cards that are not widely accepted. If merchants only accept some credit cards, and have no other efficient way to accept money from consumers, the merchant may miss out on a large number of individuals that otherwise are part of the merchant's target market.

A further difficulty with credit cards is that the transactional costs associated with accepting credit card payments are often significant. The transactional costs, which are absorbed by the merchant, can have a substantial affect on the merchant's bottom line. Credit card fees can be up to 9% (or even higher for certain product groups) of the transactional total. Additionally, there is often a time delay between the time a credit card payment is accepted by the merchant and the time the credit card company transfers money to the merchant's bank account. This time delay reduces the amount of interest income the merchant can earn, and also reduces the merchant's cash flow. The transactional costs, along with the other problems discussed above, can make accepting credit card payments very expensive for merchants.

The inventors have discovered that many of the above problems can be reduced or eliminated by employing a system based on debit, rather than credit, transactions. A system based on debit transactions can also reduce or eliminate problems caused by acceptance of other types of payments (e.g., paper checks which are sent by the consumer through the mail). The system includes a module that validates debit information, a module that verifies identity information, and a module that allows a buyer to make payments using an electronic facsimile of a personal check.

The invention provides an electronic check payment system designed to facilitate network (e.g., Internet) transactions. The electronic check payment system may include a consumer terminal configured to accept transactional debit data. The transactional debit data may include order data, consumer data, and check data. The system also includes an authorization computer adapted to be coupled to the consumer terminal via the network and configured to receive the transactional debit data. The authorization computer generates a response message indicative of one of a first condition and a second condition, where the first condition is an acceptance of the electronic check payment, and the second condition is a declination of the electronic check payment.

The invention provides a method of conducting an electronic check payment transaction. The method may include receiving, via a merchant computer, transactional debit data entered by a consumer on a merchant web site; receiving check data, representative of data on a paper check, entered by a consumer; receiving additional transactional debit data entered by a merchant; processing the transactional debit data and the additional transactional debit data; and generating a response message indicative of one of a first condition and a second condition, where the first condition is an acceptance of the electronic check payment, and the second condition is a declination of the electronic check payment.

The invention provides an identity verification system for verifying the identity of a consumer involved in a debit transaction. The identity verification system may include an identity verification module including a fraud indicator search module and a consumer identity validation search module. The identity verification module may be configured to receive a request to verify the identity of a consumer involved in a debit transaction, receive at least one consumer identification debit data element, generate an identity verification score, compare the identity verification score against a threshold value, and generate a response message to the request to verify the identity of a consumer involved in a debit transaction. The response message provides a confirmation or invalidation of the identity of the consumer.

The invention provides a method of verifying the identity of a consumer involved in a debit transaction. The method may include receiving a request to verify the identity of a consumer involved in a debit transaction; receiving at least one consumer identification debit data element; generating an identity verification score; comparing the identity verification score against a threshold value; and generating a response message to the request to verify the identity of a consumer involved in a debit transaction. The response message provides a confirmation or invalidation of the identity of the consumer.

The invention provides a debit data validation system for a network. The debit data validation system may include a calling application configured to receive a request to validate debit data, and receive transactional debit data that is to be validated. The validation system may also include a debit data search engine including a keying module and a matching module. The debit data search engine is configured to receive the transactional debit data from the calling application, and process the transactional debit data. The system may also include a debit data warehouse including stored debit data, where the stored debit data is representative of at least one consumer, and where at least one consumer key links the stored debit data.

The invention provides a method of conducting a debit data validation of a consumer involved in a debit transaction. The method may include receiving a request to validate debit data of the consumer involved in a debit transaction; receiving transactional debit data that is to be validated; and generating a response message to the request to validate debit data of the consumer involved in a debit transaction. The response message is indicative of one of a first condition and a second condition. The first condition is a validation of the debit data, and the second condition is an invalidation of the debit data of the consumer.

Additionally, the invention provides combinations of the above.

As is apparent from the above, it is an advantage of the invention to provide a method and system of debit-based electronic payments. Other features and advantages of the present invention will become apparent by consideration of the detailed description and accompanying drawings.

BRIEF DESCRIPTION OF DRAWINGS

FIG. 1 is a schematic diagram illustrating the flow of information in an electronic payment system of one embodiment of the invention.

FIG. 1A is an illustration of a content page where a consumer enters checking account information.

FIG. 2 is a layered diagram of business components used in one embodiment of the invention.

FIG. 3 is a schematic diagram of an electronic payment system of one embodiment of the invention.

FIG. 4 is a diagram illustrating the processing of a transaction acquired through a public network.

DETAILED DESCRIPTION

Figure 1B:
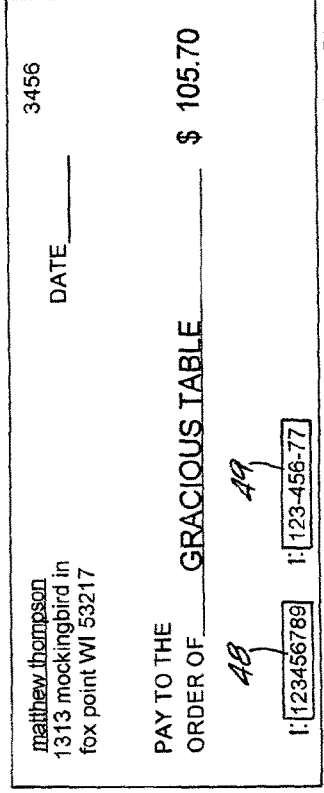
FIG. 1B is an illustration of a content page where a consumer enters magnetic ink character recognition ("MICR") data.

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. As used herein the terms computer and server are not limited to a device with a single processor, but may encompass multiple computers linked in a system, computers with multiple processors, special purpose devices, computers or special purpose devices with various peripherals and input and output devices, software acting as a computer or server, and combinations of the above.

FIG. 1 illustrates the architecture of an electronic payment system 30. The system 30 provides networked merchants (e.g., Internet merchants or retailers) with the ability to receive paperless, electronic check, payments from consumers coupled to the network. Electronic checks cost substantially less to process than credit charges, and speed the movement of money into the merchant's account relative to paper-based checks. The system 30 includes a consumer or purchaser terminal 32 where the consumer places an order and chooses an electronic check as the form of payment. The order and payment information is transferred to a computer 34, preferably a server, controlled by the Internet merchant.

The order and payment information is then sent from the merchant computer 34, preferably in an encrypted form, to an authorization computer 36. The authorization computer 36 performs various tests and examinations of the information received from the merchant computer 34, to verify the identity and authenticity of the consumer, and the information provided by the consumer through the electronic check. This examination process is discussed in more detail below.

Once the electronic check is examined, the authorization computer 36 sends a response message to the merchant computer 34. The response message includes an indication as to whether the check has been authorized or declined. If the check is authorized, the authorization computer 36 sends a message to an automated clearinghouse ("ACH") 38. The message includes information converted from the electronic check into an ACH format. The ACH 38 sends an electronic message to a merchant bank 40, which causes payment to be deposited into the merchant's bank account. The merchant's bank 40 records the deposit on the merchant's bank statement and sends the bank statement to the merchant. The ACH 38 also sends a message to the consumer's bank 42 to collect or withdraw funds from the consumer's bank account. The consumer's bank 42 records the payment on the consumer's bank statement and sends the bank statement to the consumer.

The architecture illustrated in FIG. 1 depicts only one embodiment of the invention. An alternative model (discussed in more detail below) passes the consumer from the merchant to a payment portal at the time of the electronic check payment. Such an alternative model removes the merchant as the managing entity of the overall transaction. A link between the consumer terminal 32 and the authorization computer 36 is provided such that the consumer can link to the authorization computer 36 at the time of choosing an electronic payment option. In one embodiment, the merchant computer 34 acts as a bypass in the link between the consumer terminal 32 and the authorization computer 36. Using this architecture avoids the need to place consumer payment information on the merchant computer 34. Instead, consumer payment information is input directly into the authorization computer 36, thereby enhancing security of consumer information by reducing the number of computers that handle and store that information. In this model, the merchant computer 34 only receives order information, some information that identifies the consumer, and a confirmation that payment has been accepted. Payment information, such as checking account information and the like is sent to the authorization computer 36.

When a consumer decides to purchase a product or a service from an Internet merchant, the merchant typically captures information from the consumer including name, billing (or residential) address, phone number, and email address. Other fields (or fewer fields) may be requested depending on the requirements and policies of the Internet merchant. This information is generally supplied by the consumer at a "checkout" web page after the product or the service has been selected. After the information is provided, the consumer selects which payment option to use to pay for the product or the service.

If the consumer decides to pay for the product or the service with an electronic check, the system 30 illustrated in FIG. 1 may be utilized. FIGS. 1A and 1B illustrate exemplary payment (data capture) pages as they might appear in the browser (e.g., a web browser such as Microsoft Internet Explorer or Netscape Navigator) of the consumer terminal 32. In one embodiment, the data capture pages acquire information via the web in a secure manner using standard web interface technologies. FIG. 1A illustrates a page 40 having a dialog box 42. The dialog box 42 includes entry areas for a consumer's name, address (street, city, state, zip code and country), phone number, date of birth, driver's license, and driver's license state. In one embodiment, in an effort to make the process simple and non-redundant, information supplied by the consumer to the merchant at the "checkout" page is automatically entered in the representative entry areas of the dialog box 42. The consumer may correct information if it is not displayed correctly.

After all necessary information is supplied, the consumer enters additional information from the bottom of a paper check. This additional information is utilized to generate an ACH transaction for funding. FIG. 1B illustrates a page 46 for entering the additional information. The page 46 includes a virtual check 47 having dialog boxes 48 and 49 for entry of a printed parsed MICR number. This number is broken down into two components: a routing and transit number ("RTN") or financial institution specific number, and a checking account number. To allow for ease of entry, the dialog boxes 48 and 49 on the virtual check 47 appear in a location representative of the placement of that information on a paper check. Remaining information that typically needs to be entered on a paper check such as the consumer's name and address, payee, and amount are transferred from information previously entered by the consumer or information associated with the merchant web site visited by the consumer (e.g., the payee name).

When all necessary additional information is entered, the consumer is allowed to submit the payment (up to the time of submitting the payment, the process can be aborted at any point). Submission of the payment causes the data from the entry screens to be compiled into a data stream that is sent to the authorization computer 36. In one embodiment, the data stream (e.g., name value pairs, tag delimited via world wide web consortium ("W3C") standard extensible markup language ("XML") data tags, or International Standards Organization ("ISO") format) is transformed to a message stream that includes an actual length that is calculated. The data capture screens illustrated in FIGS. 1A and 1B are representative of only one embodiment of the invention, other embodiments of the data capture screen(s) can be designed according to the Internet merchant's requirements.

It is preferred that the invention be implemented using a layered business component architecture. FIG. 2 illustrates the application services and common business components used in the system 30. As should be understood by those of ordinary skill in the art and as will become apparent from the discussion below, the services and components illustrated in FIG. 2 may exist on one or more of the computers included in the system 30. The layered business component architecture of the system 30 includes a presentation layer 50, a product drivers layer 52, an application components layer 54, a common business components layer 56, and an infrastructure layer 58.

The presentation layer 50 provides tools and mechanisms to facilitate communication between computers such as the merchant computer 34 and the authorization computer 36. The presentation layer 50 includes a browser 60 such as the web browser discussed above, client software 62 such as an operating system with a graphical user interface, an audio response unit ("ARU") and voice recognition unit ("VRU") module 64, and a messaging module 66 which supports messaging in the form of XML messages, Java Bean objects, or ISO messages. The presentation layer 50 is separated from back-end business services using conventional middleware message brokering services.

The product drivers layer 52 provides workflow management for application components included in the application components layer 54. In particular, the product drivers layer 52 provides management over an electronic check module 70, an identity verification module 72, a brokerage module 74, and an ACH funding module 76. The product drivers layer 52 may also control future modules which are represented in FIG. 2 by module 78.

The application components layer 54 includes applications to support specific needs of the system 30. The applications may be invoked by the product drivers or modules in the product drivers layer 52, or may be stand-alone applications. The applications included in the application components layer 54 in the example described herein are a check authorization application 80, an ACH funding application 82, a debit bureau application 84, an ATM advanced functions application 86, a maintenance application 88, a data navigator application 90, an Internet banking application 92, a fraud case management application 94, a transactional search application 96, an electronic messaging application 98, and an interface application 100. As the system 30 grows to meet future needs, additional applications may be required. These future applications are represented in FIG. 2 by application 102.

The common business components layer 56 includes a card management component 110, an account management component 112, a financial transactions component 114, a cardholder management component 116, a merchant management component 118, and a device management component 120 which supports ATM and point of sale ("POS") device management. The business components 110-120 represent reusable business components that support common functions across the applications 80-102. Accordingly, the components 110-120 represent objects and functions that are common to the applications 80-102 used in the system 30.

The infrastructure layer 58 includes a common object request brokerage architecture ("CORBA")/Enterprise Java Beans module 130, a database management system ("DBMS") module 132, a middleware module 134, and a security module 136. The CORBA/Enterprise Java Beans module 130 provides a way of communicating between distributed objects and executing programs written in different languages regardless of where the programs reside in the system (or network), or on what platform the programs run. Preferably, the applications 80-102 are constructed using CORBA-compliant object request brokers ("ORBs"), such that when a client in the system makes a request, the relevant ORB directs the request to a server containing the desired object, and then redirects the results back to the client.

FIG. 3 provides a more detailed illustration of the data flow between the computers in the system 30 as well as the architecture of the authorization computer 36. A consumer at the consumer terminal 32 accesses a merchant web site posted on the merchant computer 34. (FIG. 3 also illustrates a merchant host computer 137. As should be appreciated, a typical merchant may utilize one computer for hosting a web site, e.g., merchant computer 34, and another computer for hosting business applications, e.g., host computer 137). When the consumer decides to purchase one or more items, the consumer selects a payment option. One option might be to pay using a credit card. Another option might be to pay using an electronic check. If the consumer chooses to pay with an electronic check, the merchant computer 34 collects appropriate checking account and identity information from the consumer as discussed above. In one embodiment, the electronic check payment option may allow the consumer to defer payments over a certain time period (e.g., a big ticket item may require payments of a certain amount each month for the next two years). In another embodiment, the electronic check payment option may allow the consumer to make recurring payments for a set amount of time (e.g., a consumer wants to pay a merchant a certain amount every month to cover services the merchant provides to the consumer each month). Merchant computer 34 formats the data according to a document type definition ("DTD"), which is preferably an XML specification. Once the data is formatted, the merchant computer 34 transmits the data to the authorization computer 36. The merchant computer 34 also sends a certificate so that the identity and authenticity of the merchant can be verified. The authorization computer 36 authenticates the certificate received from the merchant computer 34 using a lightweight directory access protocol ("LDAP") and determines the security rights of the merchant computer 34.

As shown in FIG. 3, the authorization computer 36 may be designed with various security and backup features, additional hardware to support applications, and hardware to format and route data to the additional hardware. In the example shown, the authorization computer 36 includes a first firewall 140, a primary server 142, a failover server 144, a second firewall 146, and a converter and router 148 that performs integrated data capture and convert ("IDCC") operations and that executes a rules and formatter application 149. The converter and router 148 is connected to a tracking server 150 and an application server 152. A pass-through Java servlet 153 running on the primary server 142 sends the customer's transactional debit data request to a Java server 147 running on the converter and router 148. The Java server 147 places the input request (considered a "transaction) into a queue for the rules and formatter application 149 running on the converter and router 148. The rules and formatter application 149 pulls the transactions from its queue one-at-a-time to perform formatting and data conversion operations on each transaction. The rules and formatter application 149 puts the transaction into a queue for the tracking server 150 for creating a log of transactions. A tracking application 154 running on the tracking server 150 creates the log of the transactions, making them available to a transaction inquiry application used for diagnosing transaction problems. Each formatted and converted transaction is routed to the electronic check module 70 running on the application server 152.

The electronic check module 70 determines what business services are required for the particular transaction at hand. If identity verification is required then the identity verification module 72 on the application server 152 is executed. As will be discussed in greater detail below, the identity verification module 72 returns a score that is compared against a threshold for the particular merchant/transaction combination at hand. If the scoring threshold is not met, the electronic check module generates a response message that indicates the identity verification has failed and sends that response message back to the acquiring channel (i.e., the merchant computer 34 and the consumer terminal 32). If the scoring threshold is met, the electronic check module 70 continues with the check authorization and ACH funding request, as appropriate.

The electronic check module 70 passes control to a transaction adapter module 155 running on the application server 152. The transaction adapter module 155 generates an authorization/funding request in an ISO 100 (authorization only) or an ISO 200 (authorization optional+funding) format and sends the request to a transaction switch module 158 on a settlement server 156. The transaction switch module 158 forwards an ISO message to a shared check authorization network ("SCAN") server 160. As is known in the art, the SCAN server 160 includes a database of check information that includes the history of check activity for individuals, and is used to make determinations as to whether a personal check should be accepted from a person paying by check. The check information in the database includes information about closed accounts, stop payments, uncollected funds, payees that are deceased, frozen accounts, and the identity of high-risk customers, i.e., customers that have a high likelihood of writing checks that may be returned due to insufficient funds. The SCAN server 160 includes a SCAN online module 161 (real-time risk management system that utilizes both the MICR information from the check and the customer's driver's license number), a SCAN reporter 162 (a module that creates reports in response to queries), and a SCAN host 163 (the base software and the database of check information). The SCAN server 160 may execute check authorization filters if an authorization service request is received.

The authorization filters can be adjusted according to the merchant's requirements. In one embodiment, the system 30 supports the ability for merchants to specify account numbers that are to be treated as "Always Approve." These very important person ("VIP") accounts may be consumers that the merchant wants to treat "right." Similarly, the merchant may want to setup an "Always Decline" list of account numbers. The "Always Decline" list may include consumers that provided payments in the past that were not to the satisfaction of the merchant. In another embodiment, the system 30 supports the capability to switch to external authorization sources. If the external authorization source fails to respond within a specified time frame (such as two seconds), the system 30 may proceed with the standard internal authorization. In yet another embodiment, the system 30 can be set to filter check amounts to have a "Do Not Exceed" amount. Different levels of "Do Not Exceed" amounts can be utilized (e.g., one level for a particular store, another higher level for a chain of stores, another even higher level for the overall system 30, etc.). If an electronic check request exceeds a "Do Not Exceed" amount, the transaction is declined.

If a funding-only request is received, then the SCAN server 160 bypasses the authorization filters and passes the request directly to a funding module (not shown) of the SCAN server 160. The SCAN server 160 funding module logs the funding request in a transaction file (such as a V102 file). The transaction file is delivered to an ACH settlement engine 165 running on a second settlement server 167. The SCAN server 160 also sends an ISO response back to the transaction switch 158. The transaction switch 158 logs the response on a settlement processor 169 in the settlement server 156 for later processing.

The transaction switch 158 sends a response back to the transaction adapter module 155. The transaction adapter module 155, in turn, sends a response to the electronic check module 70. The electronic check module 70 generates a response message and sends that message to the IDCC channel (i.e., the router and converter 148). The IDCC channel delivers the message back to the acquiring channel (i.e., the merchant computer 34). In particular, the IDCC channel places the response in the application response queue for the servlet 149 running on the converter and router 148 and the IDCC channel places the response in the queue for the tracking server 150. The tracking server 150 matches the transaction and the response and then logs the transaction and the response information. The logs may be used for reporting, audit trail purposes, and billing purposes. The servlet 149 running on the converter and router 148 identifies the arrival of responses and forwards the responses to the pass-through application 153 running on the primary server 142. The pass through application 153 forwards the data stream back to the acquiring channel. The merchant computer 34 sends an HTML reply to the consumer terminal 32 indicating if the electronic check transaction is accepted or declined.

The SCAN server 160 sends a transaction log file message to the ACH settlement engine 165 on a periodic basis, such as every 30 minutes. This message is used to drive ACH funding processes. The ACH settlement engine 165 builds ACH files and delivers them to the originating depository financial institution ("ODFI") to move funds from consumer accounts to a holding account controlled by the operator of the authorization computer 36 (herein after "system operator"). The settlement processor 169 processes transaction switch log records on a periodic basis (such as once a day) and generates ACH transactions to move funds from the holding account to merchants' bank accounts.

As discussed above, once the transactions are converted into an ACH routable format, the transactions are prepared for clearing and settlement via the ACH network. All transactions performed via the ACH network are performed in accordance with all applicable National Automated Clearing House Association ("NACHA") operating rules. ACH files are transmitted on behalf of the merchant into the ACH network for distribution to the Receiving Depository Financial Institutions ("RDFI"). The merchant's bank accounts are typically updated with a deposit within a reasonable time, such as 24 hours. Consumers generally receive verification of the debit transaction on their monthly checking account statement.

In the event that a transaction is returned through the ACH network (e.g., due to insufficient funds, closed accounts, etc.), the debit transaction is automatically re-initiated. In one embodiment, electronic representments may be initiated up to three times. The Internet merchants benefit from this service because the number of returned checks is reduced, thereby reducing the merchant's need for returned check management. Returned checks also often result in bank fees, loss of goods, loss of revenue, and loss of staff time.

In some instances, the merchant may need to credit the consumer's account (e.g., order disputes, returned merchandise, defective merchandise, overcharges, partial shipments by the merchant, orders unable to be fulfilled because of low stock, restitution due to consumer dissatisfaction, etc.). In one embodiment, the merchant computer 34 includes an interface that allows the merchant to credit the consumer's account. The merchant enters the original invoice number into the system 30. The system 30 is designed to then identify the original consumer debit transaction and return the order number, the consumer name, the original transaction date, and the status of the original transaction (e.g., debit submitted and not returned, debit submitted and returned with the date returned noted, debit submitted and returned and then resubmitted with the date resubmitted noted, etc.) information to the merchant. The amount credited to the consumer should not exceed the dollar amount of the original transaction (unless circumstances necessitate it, e.g., restitution and damages to consumer for merchant error). Similar settlement features as are discussed with respect to the debit transaction may be provided for the credit transactions as well.

In the embodiment shown, communications between components of the system 30 are primarily transmission control protocol/Internet protocol ("TCP/IP") communications. When the application server 152 is a mainframe computer, the IDCC channel communicates with the application server via a middleware messaging software such as MQSeries software, which also uses TCP/IP for low-level communications. Messages passed between subsystems may be in a variety of formats including standard ISO formats.

Transactions conducted using the system 30 may be identified in a number of ways. In the embodiment shown, transactions are tagged at the merchant computer 34 with an order number and a merchant specific transaction number. The order number may be a 40-character alphanumeric number that is displayed to the consumer. The merchant specific transaction number may be a 12-character numeric field that is generated internally by the merchant. These two fields are used in combination with a merchant identification number and the current date to provide the basis for duplicate transaction checking. In one embodiment, a duplicate transaction is defined as a transaction received within five minutes of another transaction with the same merchant specific transaction number, order number, merchant identification number, and date. In other embodiments, the definition of a duplicate transaction may also be based upon one or more of the same bank code, bank check digit number, checking account number and transaction amount. If a duplicate transaction is found, the transaction is logged accordingly for later use. The order number and transaction number are passed throughout the system 30. The ACH settlement engine 165 passes on the order number in the ACH funding request so that it appears on the consumer's statement as a transaction reference number.

The IDCC channel assigns a unique identifier (such as a 48 byte ID) to transactions when the transaction is acquired by the MCC channel. This unique identifier is logged by IDCC channel and may be used for internal IDCC channel troubleshooting.

The SCAN server 160 also generates a unique identifier for authorization requests. In one embodiment, the SCAN server 160 generates a 12-digit numeric item identifier for each authorization request that it receives. The last 5 digits of the item identifier are used as a pseudo check number for the transaction at hand so that contributions may be made to the SCAN host 163. The identifier is passed back through the system 30 to the merchants so they can use the identifier for future transaction retrieval, if necessary.

As noted above, the system 30 provides an electronic payment mechanism in the form of an electronic check. Like an actual check, the system 30 relies on MICR data. As discussed above, MICR information includes an RTN or financial institution specific number, and the checking account number. MICR information also includes a check number, although in the embodiment described, the check number portion of the MICR information is not utilized by the system 30. There are typically two ways to pass MICR information to a payment system, in a raw MICR format or in a parsed MICR format. The raw MICR format includes the data gathered by physically scanning an image of a check. The raw MICR format represents the actual string of MICR characters with the special symbol characters being replaced by the letters T (routing and transit), O (on us), A (account), and D (dash). Entering in the raw MICR usually involves using a special MICR keypad on the browser. Imbedded spaces in the raw MICR often make it difficult for the consumer to enter in the exact MICR as it appears on their check.

The parsed MICR format includes the data separated or parsed and entered as separate data elements. In order to enter the parsed MICR information, the consumer needs to be able to decipher the MICR information and determine these data elements. As discussed above, the data capture page illustrated in FIG. 1B includes a virtual check that is representative of the paper check from which the consumer is acquiring the MICR information. This format allows the consumer to easily decipher the MICR information for entry on the page 46. It is preferred that the parsed MICR format be used because it is generally easier for a consumer to input the MICR information into a browser-displayed dialog box. However, the system 30 can be designed to accept either format and can be equipped with a mechanism to indicate which format is being used.

In the embodiment described, the majority of electronic check transactions are acquired via the Internet. Security of the transactions may be provided using an interface such as an XML interface or a Java Bean interface method and middleware 200, shown in FIG. 4. Additionally, as discussed above, a digital certificate identifying the merchant as a participant in the system 30 and defining the merchant's status within the application is typically utilized. Other security measures that may be provided include limiting merchants access to data to only their own data, supporting digital signatures of merchants, providing a method to ensure that all originators have been certified by a recognized certification program (i.e., the originator's Internet sessions, data capture, and storage procedures meet or exceed an established minimum level of security), automating breach of security notifications, and encrypting data traveling within and external to the system.

The system 30 supports Internet connection methods such as web server to web server, leased line with/without encryption, and application server to web server. When using an XML interface, the merchant computer 34 is responsible for building an XML request using the named data elements method and sending the request to the application server 152 via a hypertext transfer protocol secured ("HTTPS") session. Preferably, a 128-bit secure socket layer ("SSL") encryption connection is provided between the merchant computer 34 and the application server 152. Further, the structure of the XML request should correspond to a predetermined DTD specification issued by the operator of the authorization computer 36. When a Java Bean interface is used in the system 30, the Java Bean module is instantiated on the merchant computer 34. The Java Bean module calls set methods to set the appropriate request fields (including digital-certificate related information). The module's execute method is then called to send the request, again in an HTTPS encrypted session, to the application 152.

Electronic check transactions may also be requested via private networks including mainframe-to-mainframe acquisition channels. When such a channel is used, the need for middleware such as that described above is eliminated. However, when mainframe ("MF") acquisition is used, customer information control system ("CICS") software or similar software is used to provide information to end users as to how requests are sent to the authorization computer 36. For example, Cobol source code may be provided to illustrate how CICS advanced program-to-program communications ("APPC") calls, such as APPC/LU 6.2 calls, may be made.

Preferably, the message structure in the mainframe-to-mainframe channel includes a number of tagged or tokenized message components. In this one preferred embodiment, each message component in the request message is made up of the following parts: a 3-byte data length field, a 4-byte data code field, and the subject data. A special CICS transaction identifier may be assigned to the electronic check transaction to differentiate them from other electronic requests such as identification verification requests (which are discussed below).

Communications to the authorization computer 36 may also be conducted via leased lines. As best seen by reference to FIG. 5, in one embodiment a transaction switch module 220 acquires transactions via a merchant host ("MH") component 222 and an acquirer processor interface ("ACQ PI") component 224. Both of these acquiring components use a TCP/IP communications handler ("CH") 226 to communicate with a merchant host system 233 of a merchant host computer 234 and process external messages in standard ISO formats. As will be discussed below, an electronic check transaction may include many identification verification data elements that are not passed within the ISO message formats. Thus, the MH component 222 and the ACQ PI component 224 also handle data elements in other message formats. In particular, if a new data element is not configured in an ISO format, it is placed in a large private data ("LPD") field of the ISO message and maintained as a tagged data element or as part of a predefined structure.

ISO messages are mapped by the MH component 222 into an internal message called a financial inter-process communication ("FIN IPC") formatted message 227. The FIN IPC formatted message 227 is routed to an issuer processor interface ("ISS PI") component 228 which converts the internal message back to the external ISO format and sends it to the product drivers layer 52 via a TCP/IP CH 230. In the leased-line embodiment, the product drivers layer 52 is modified to accept ISO formatted transactions. Specifically, the product drivers layer 52 is modified to include a transaction adapter module (e.g., transaction adapter module 155) that accepts TCP/IP connections and ISO requests from the transaction switch module 220, maps the ISO format to the standard internal format, and then forwards the requests on to the electronic check module 70. When the transaction is processed through the electronic check module 70, the transaction adapter module builds an ISO 210 response message and returns it back to the ISS PI 228 of the transaction switch module 220. The ISS PI 228 forwards the message to a merchant host computer 234. The merchant host computer 234 returns the ISO 210 response back to the merchant computer 34 and then logs response activity.

The router and converter 148 transforms data received in the IDCC channel using a number of rules and formatting steps, and then delivers that data to the appropriate end application in the appropriate format. The rules and formatting steps are important for increasing the efficiency of the overall system 30. Each data element value is compared to acceptable edit masks and allowable values in order to ensure that only acceptable data passes to the application server 152 for processing. Data elements that do not pass each verification step are returned to the merchant or the consumer for correction along with an identifying error condition. Within each data element, the values of data elements are compared against the data format, length, and mask rules. Data values that fail the edit and which cannot be standardized (i.e., fixed) are returned as an error. Types of edits include examination of acceptable data type and maximum length, character and value patterns, decimal placement and location of embedded spaces, delimiters and special characters. Data elements that do not pass the edit but can be converted to the standard mask are passed to the standardization of data elements process step. Data values are standardized via removal or addition of embedded spaces, zeros, or special characters. Data element values which are not received in discrete fields are parsed accordingly (e.g., parse billing address into street number and name, city, state, zip code, etc.). In addition, some of the incoming data values are converted to a standardized value (e.g., value of "1" indicating a "yes" condition may be converted to a "Y"). Data element content may also be validated by matching the input value against a domain of allowable values for data elements with defined domains when applicable. If a match within the domain is not found, an error condition is returned to the merchant or the consumer.

Some format examples for the data elements include the RTN (9 characters and numeric), checking account number (6 or more characters and numeric), billing address (must exist and all fields (i.e., street, city, state, zip code) must be complete and contain data), billing address zip code (5 or 9 characters and numeric), home phone (must exist and be 10 characters and numeric), business phone (if it exists, 10 characters and numeric), and email (must contain domain extension). All data elements utilized by the system 30 include a definition of format (character or numeric), maximum or minimum length, edit rules, and additional notes.

Figure 5:
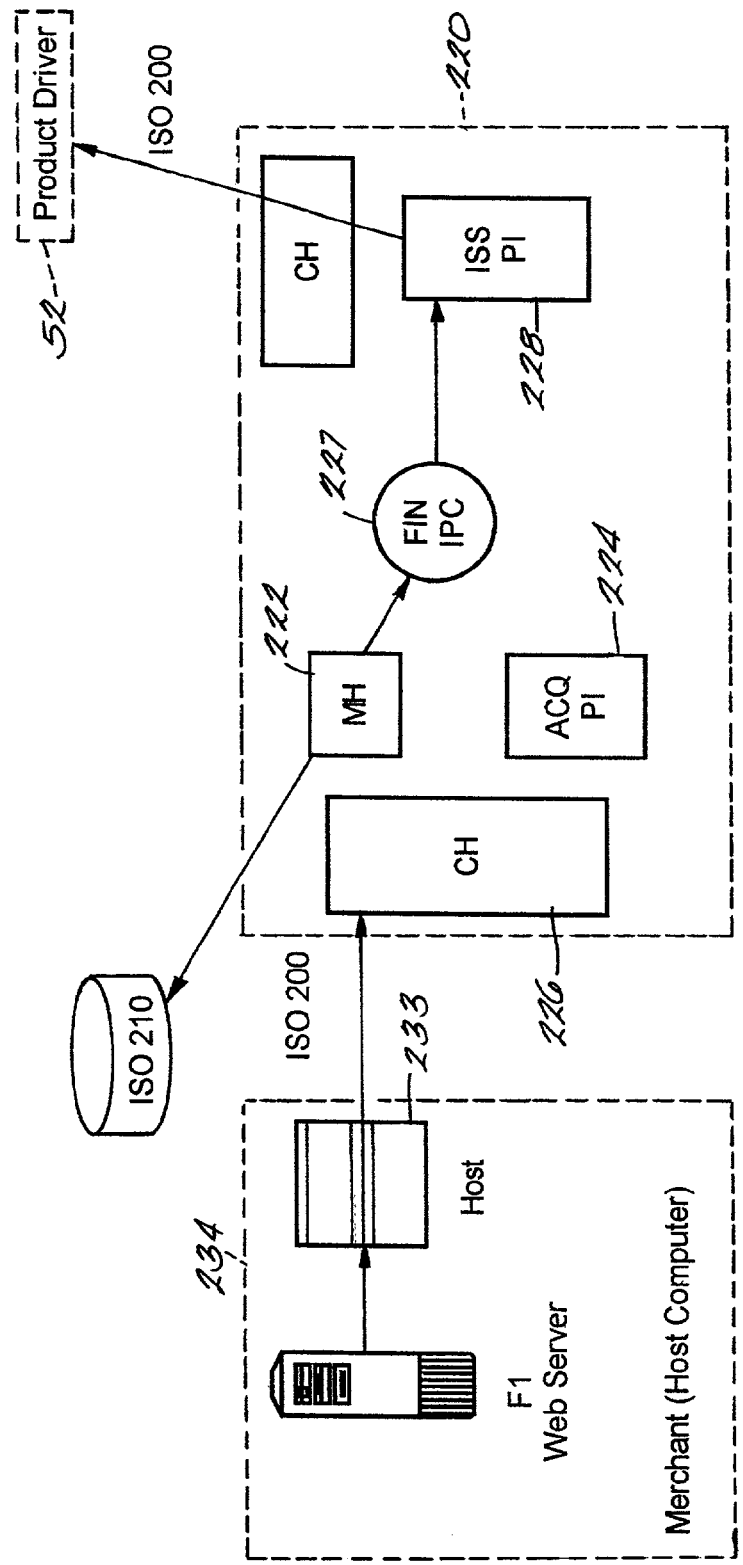
FIG. 5 is a diagram illustrating the processing of transactions acquired via leased lines.
Figure 6:
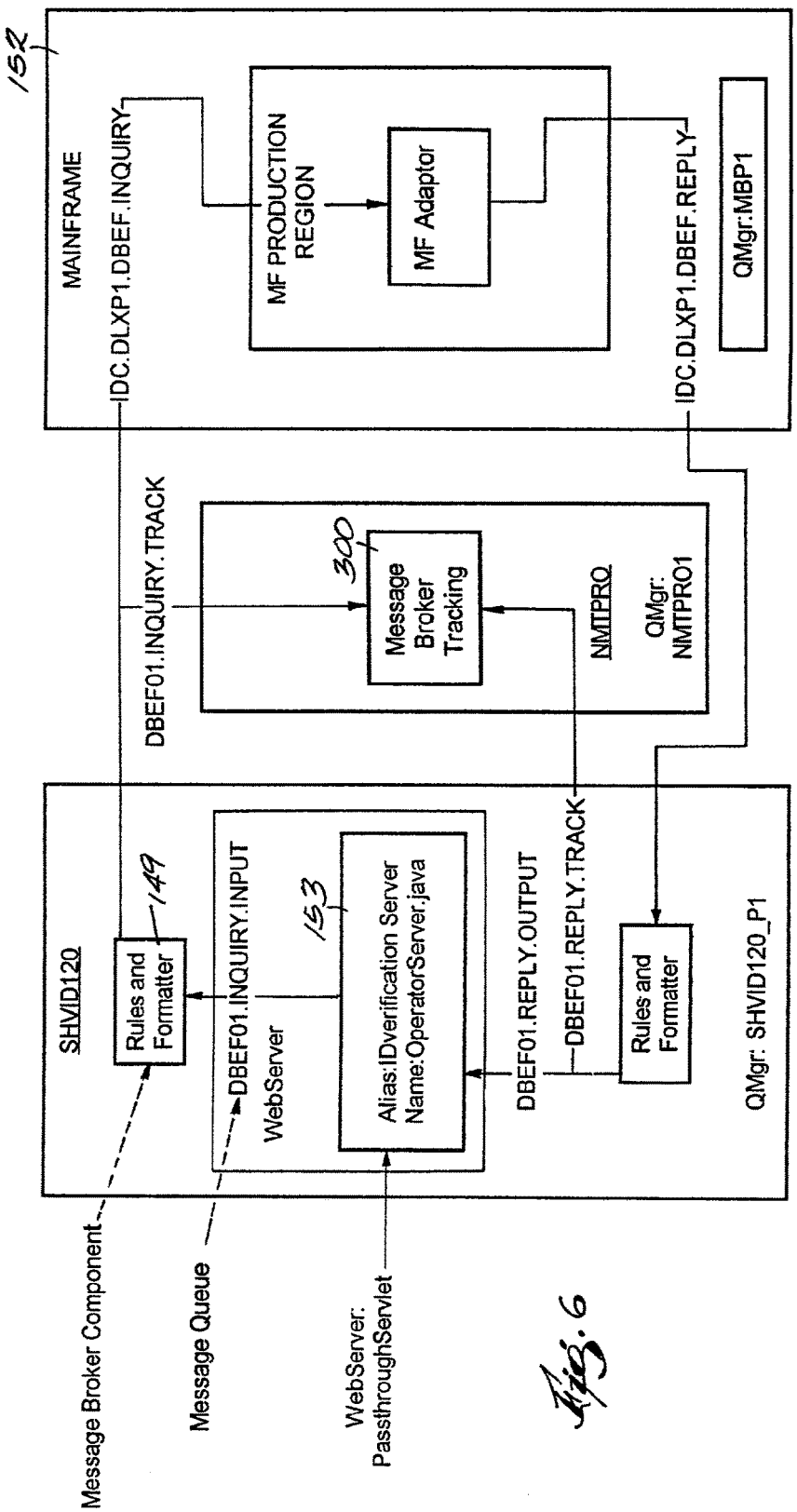
FIG. 6 is a diagram illustrating the middleware used to convert data acquired in multiple different formats to formats compatible with end applications.

The operation of the router and converter 148 is shown in greater detail in FIG. 5. In the web-acquisition embodiment, the rules and formatter servlet 149 running on the router and converter 148 receives the electronic check requests from the pass-through servlet 153 running on the primary server 142. The pass-through servlet 153 puts the request on a message queue (e.g., queue name DBEF01.INQUIRY.INPUT), which feeds the rules and formatter servlet engine 149. The rules and formatter servlet 149 performs transformation and routing activities, feeding the back-end electronic check module 70 via the MF adapter running on the application server 152. Messages are also routed to queues that feed a message broker tracking module 300 (FIG. 6) which stores records for auditing purposes. The message broker tracking module 300 may be implemented using tracking modules such as those sold under the NEON brand and produced by Neon Systems, Inc.

As noted, of the three available acquisition channels, only the web acquisition channel includes the IDCC middleware component. The mainframe-to-mainframe acquisition channel feeds data directly to the product drivers layer 52. The transaction switch acquisition channel feeds data through the transaction switch and sends acquired requests to the product drivers layer 52 via TCP/IP. Duplicate transaction checks are performed at the product drivers layer 52, since the product drivers layer 52 is common to all three acquisition channels.

Figure 7:
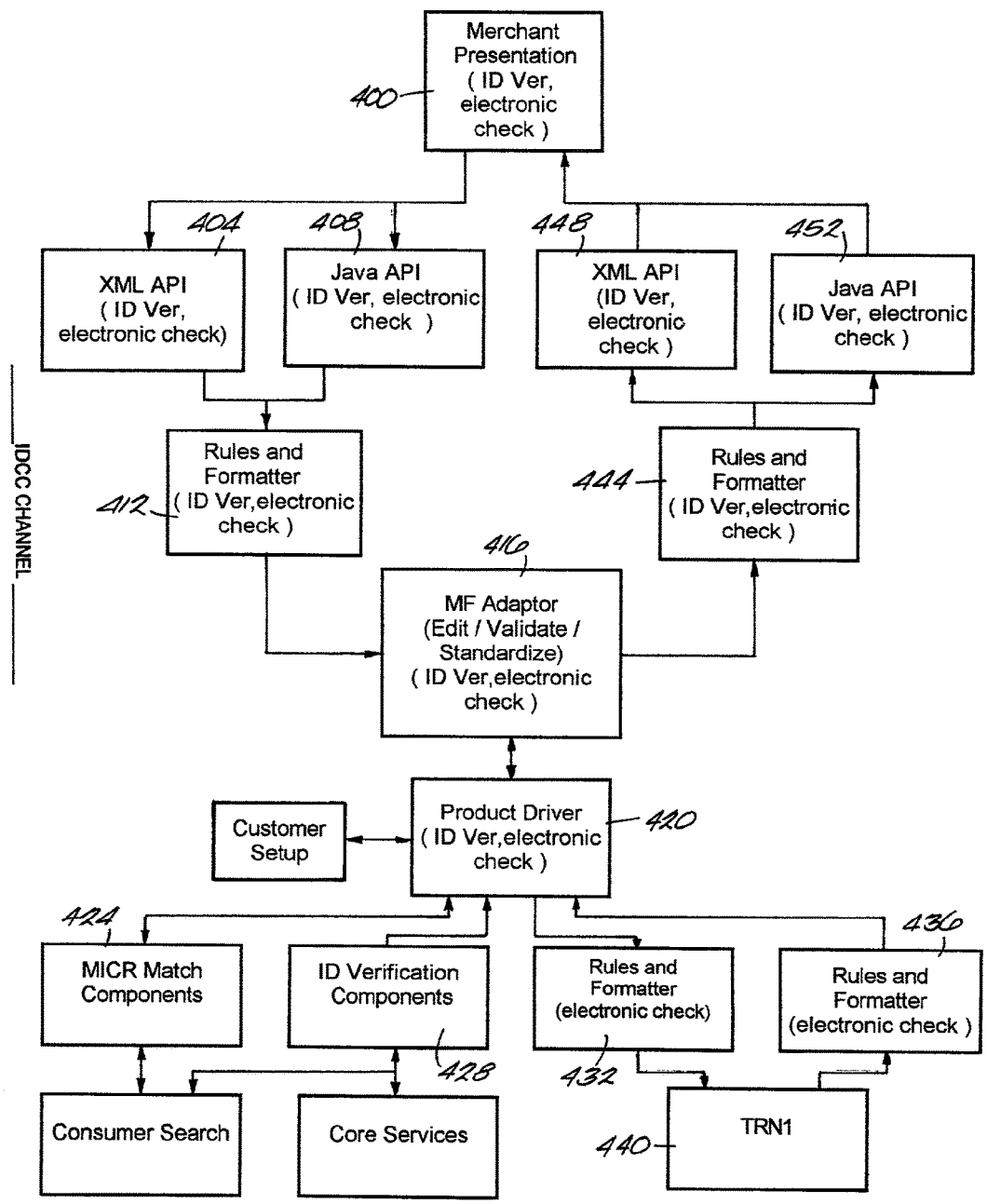
FIG. 7 is a diagram illustrating the transmission of requests to product driver applications through middleware.

FIG. 7 illustrates how the electronic check module 70 in the product drivers layer 52 receives requests from the IDCC channel via the MF adapter component. The electronic check module 70 drives several business services including identity verification and transaction switch authorization/funding services. As shown at block 400, a merchant makes a presentation or request for a service such as processing an electronic check or verifying the identity of a consumer. XML or Java APIs receive the request from the merchant, as shown at blocks 404 and 408. The rules and formatter application 149 of the converter and router 148 transforms the request according to the merchant's specification and maps the request to a standard format, as shown at block 412. The MF adapter component edits, standardizes and validates the request, as shown at block 416. As shown at block 420, the applicable product driver (such as the electronic check module 70) authorizes the merchant, determines applicable product components, such as those illustrated in blocks 424 and 428, determines the order and the dependencies of the product components, and builds the product. Responses are built for the applicable services. For example, once the identity verification services are executed (block 428), a verification response is built. Further, an authorization response is built as a result of executing authorization services (blocks 432, 436, and 440). The applicable product driver bundles the responses (block 420) and the rules and formatter application 149 maps the bundled response to the merchant's format (block 444). The XML and Java APIs finally send the bundled response to the merchant, as shown in blocks 448 and 452.

Figure 8:
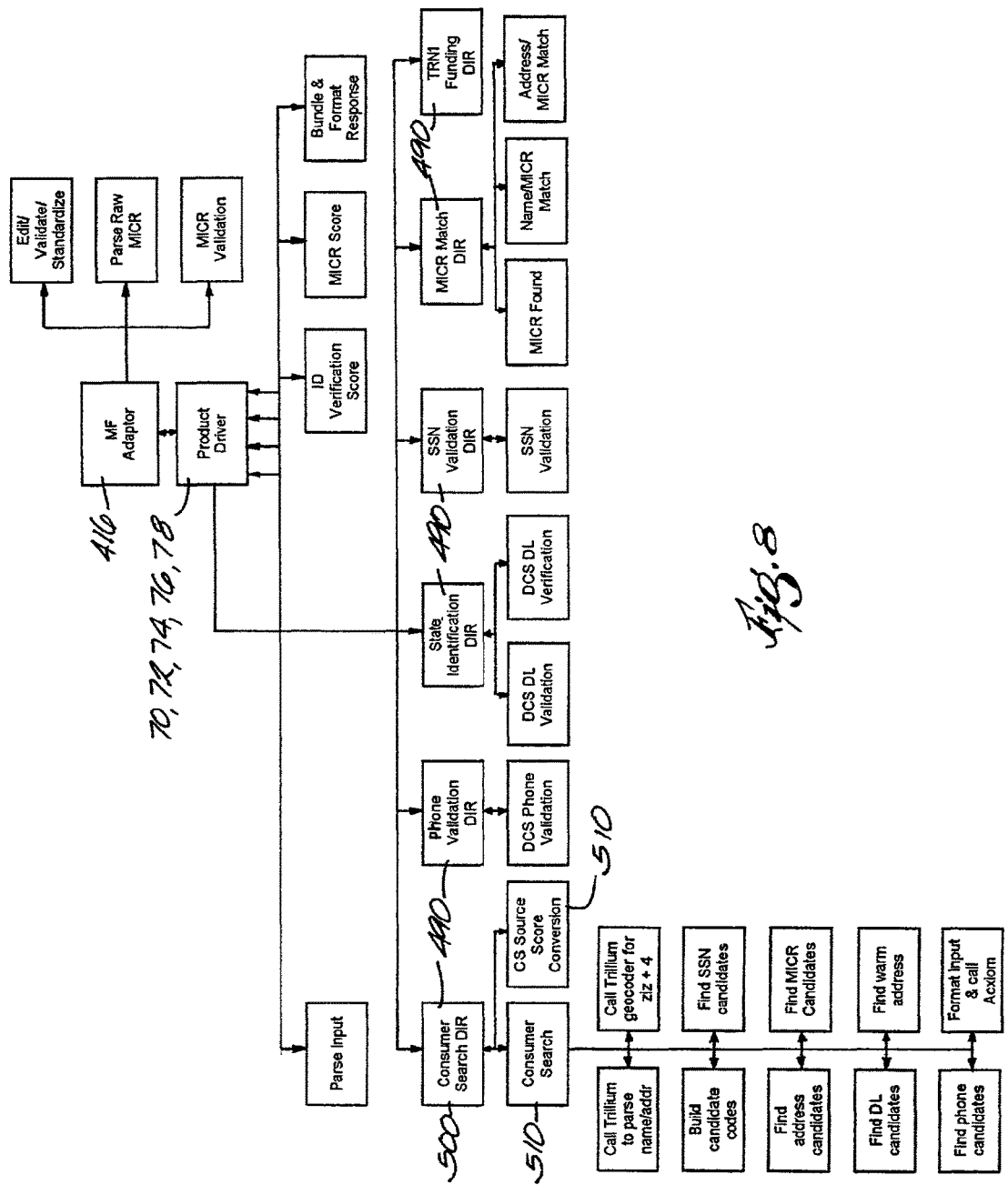
FIG. 8 is a diagram illustrating the processing performed by a mainframe adapter component

The operation of the MF adapter component 416 or transaction adapter module 155 is illustrated in FIG. 8. The MF adapter component 416 performs a series of edits on requests and then passes control to the applicable product driver 70, 72, 74, 76, 78, which then decides which business services are necessary for the transaction at hand. FIG. 8 illustrates how product drivers 70, 72, 74, 76, 78 work with a series of discreet interface response ("DIR") components 490 to drive business service execution. For example, a consumer search DIR component 500 is the driver interface in front of a series of consumer search subfunctions 510. The consumer search DIR component can be executed while one or more other DIRs are also executing. This architecture allows the product driver to run parallel business services, which improves overall response time.

Figure 9:
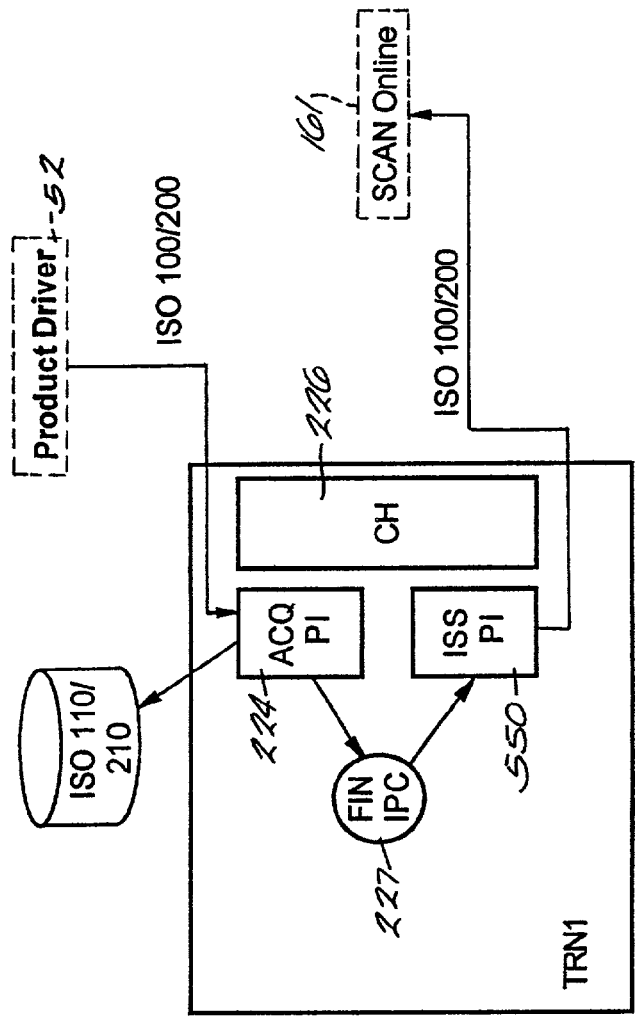
FIG. 9 is a diagram illustrating processing of authorization and funding requests.

FIG. 9 illustrates the flow of electronic check transactions through the IDCC middleware via the transaction adapter module 155 to the transaction switch module 158. The transaction switch module 158 forwards transactions it receives to the SCAN server 160 for authorization processing, funding processing, or both. The transaction switch logs the processing type, either an ISO 110 (authorization only) or an ISO 210 (funding). The logged record is then used by the settlement processor 169 in the settlement server 156, such as the Retail V300 Settlement system offered by IBM, for merchant settlement. Authorization and funding requests are sent from an applicable product driver via the transaction adapter module 155 to the transaction switch module 158 via a standard ISO 100 or 200 format using TCP/IP. The CH 226 in the transaction switch delivers the request to an ISO ACQ PI component 224 which converts the message to the internal switch format, the FIN IPC formatted message 227. The FIN IPC formatted message 227 is then routed to an ISO ISS PI 550 which uses the CH 226 to route the request to the SCAN server 160 for authorization and/or funding. When the SCAN server 160 responds, the response flows back through the same path with the acquiring processor interface logging the response as either an ISO 110 or an ISO 210 message. The logged record is used by the settlement processor 169 to perform the merchant settlement. The acquiring processor interface then delivers the ISO 100 or the ISO 200 response back to the applicable product driver.

If an electronic check transaction is acquired via the transaction switch module 158, as opposed to via web acquisition, the electronic check transaction flows through the transaction switch module 158 multiple times. These multiple flows are treated specially. For an electronic check transaction that includes a funding request, two ISO 210 records are logged. The acquisition log record is settled between the merchant and the issuing processor, which in this case is the applicable product driver. The funding log record is settled between an internal holding account of the system operator and the acquiring processor, which is the product driver, now acting as an acquirer. The internal holding account is settled against the consumer's account via the ACH settlement engine 165.

Figure 10:
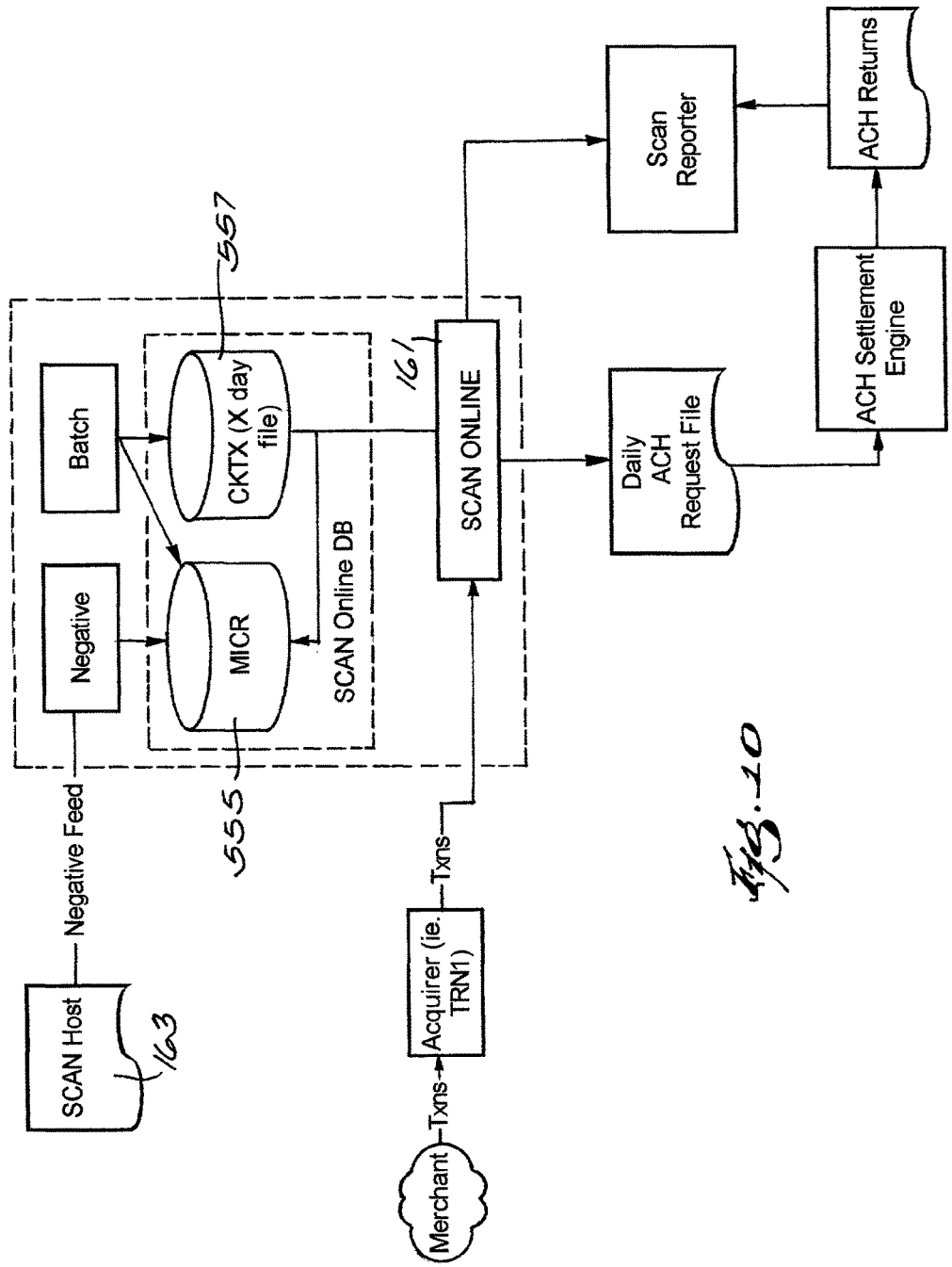
FIG. 10 is a diagram illustrating check authorization processing performed in an electronic check transaction.

The SCAN host 163 provides negative check information to a MICR database 555 (FIG. 10). Batch (historical) checking information is delivered to a check transaction ("CKTX") database 557. Information about a particular, or the particular, transaction at hand is provided to the SCAN online module 161. The SCAN online module 161 performs check authorization processing for each electronic check transaction. If the electronic check transaction includes the ACH funding service, the SCAN server 160 logs the funding request for the ACH settlement engine 165 to process. The ACH settlement engine 165 returns the results of the ACH process to the SCAN reporter module 162, which generates a report of the transaction.

Figure 11:
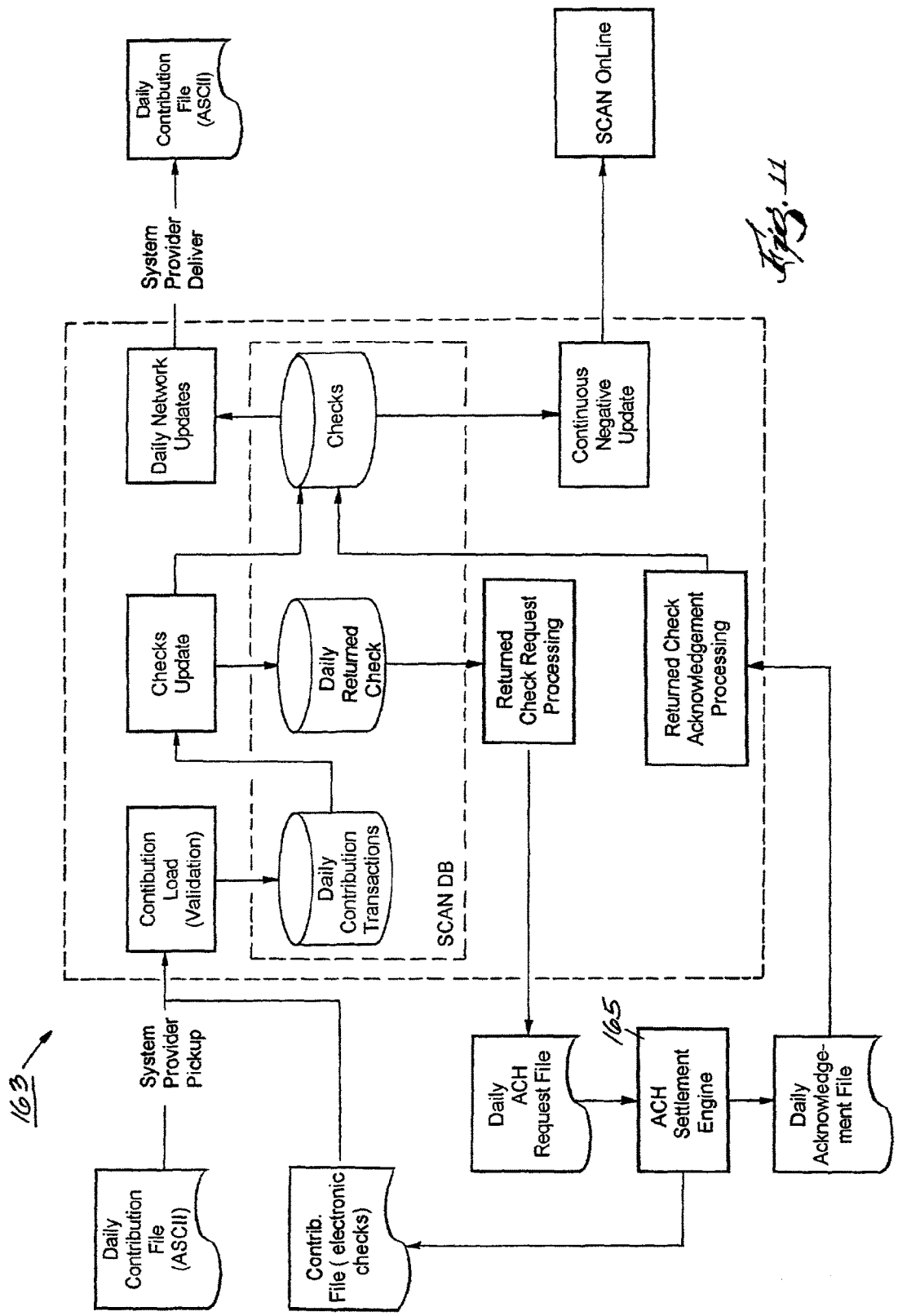
FIG. 11 is a diagram of a check contribution data subsystem.

FIG. 11 illustrates the operation of the SCAN host 163. The SCAN host 163 is responsible for accepting, managing, and delivering check contribution data to and from external and internal sources. The SCAN host 163 also provides continuous negative file update information to the SCAN online module 161. The SCAN host 163 is primarily a batch system.

Figure 12:
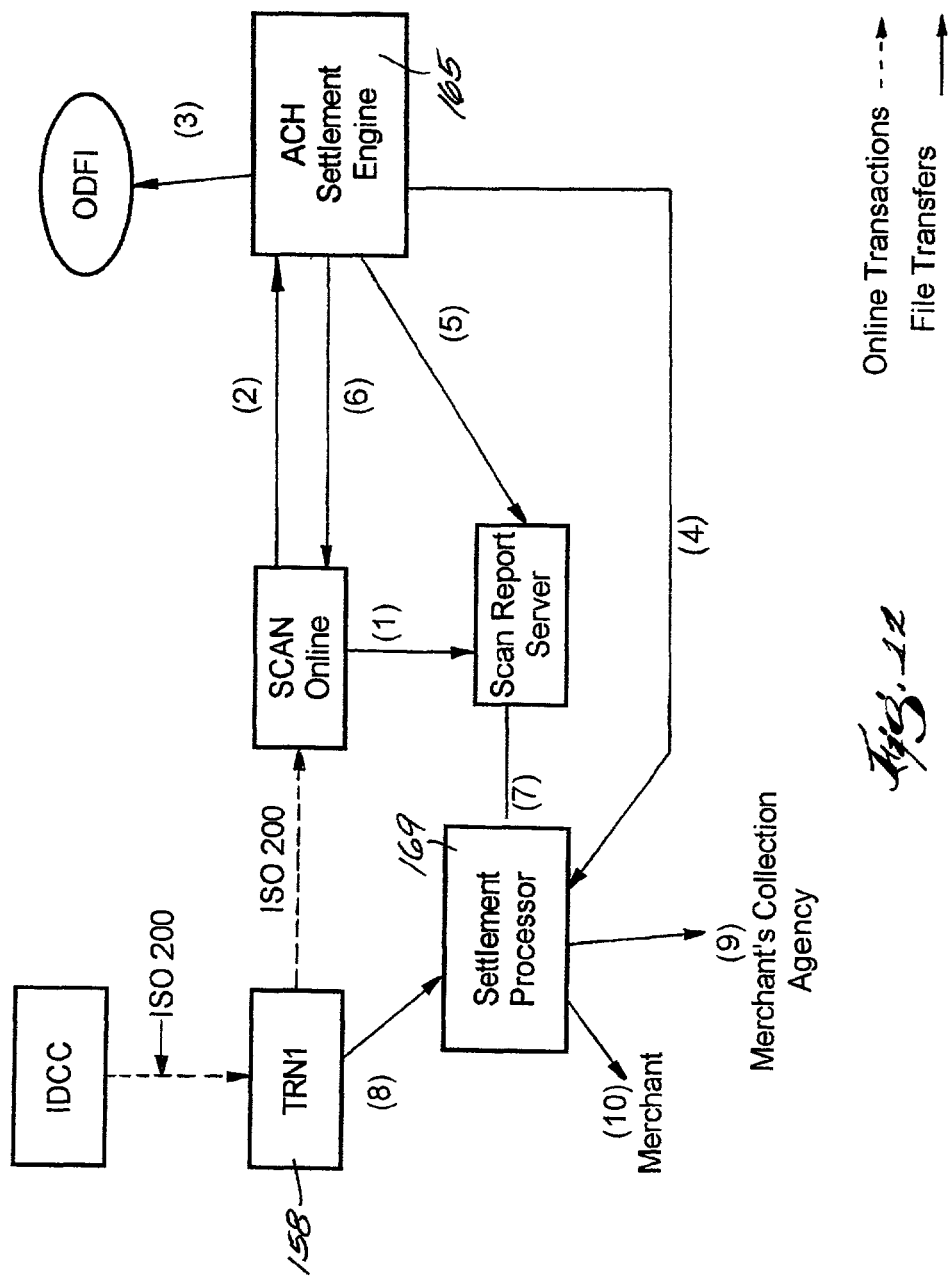
FIG. 12 is a diagram of ACH funding process performed by a settlement engine.

FIG. 12 illustrates ACH funding processing and file movement between funding and settlement related components of the system 30. SCAN server 160 produces a log file and sends that file to the SCAN reporter 162 (as transactions occur). The SCAN server 160 also sends a log file to the ACH settlement engine 165 (e.g., every 30 minutes). The settlement engine 165 creates an ACH file and sends that file to the ODFI for fund processing in the ACH network. The ACH settlement engine 165 also creates an automatic reconfiguration file and sends that file to the transaction switch module 158 (via file transfer protocol ("FTP")). The ACH settlement engine 165 produces the final disposition file and sends that file to the SCAN reporter 162 (includes monthly service fee revenues). The ACH settlement engine 165 sends a contribution file (including uncollected items) to the SCAN host 160. The SCAN reporter module 162 creates several report files including a returned items file, a returned items and a fee settlement report, and a monthly activity summary report. These reports are sent to the transaction switch module 158. The transaction switch module 158 unloads to the settlement processor 169 (e.g., six unloads per day). The transaction switch module 158 also sends a returned items file to collection agencies via FTP. If a merchant has the capability to conduct its own ACH formatted transaction, the merchant may choose to use that functionality in place of the ACH features provided by the invention. The system 30 is modularized with the ability to return an ACH formatted account number as opposed to settling the transaction on the merchant's behalf. The transaction switch module 158 receives the reports from the SCAN reporter 162, which creates standard headers and prepares the reports for customer distribution or storing on online fiche.

Figure 13:
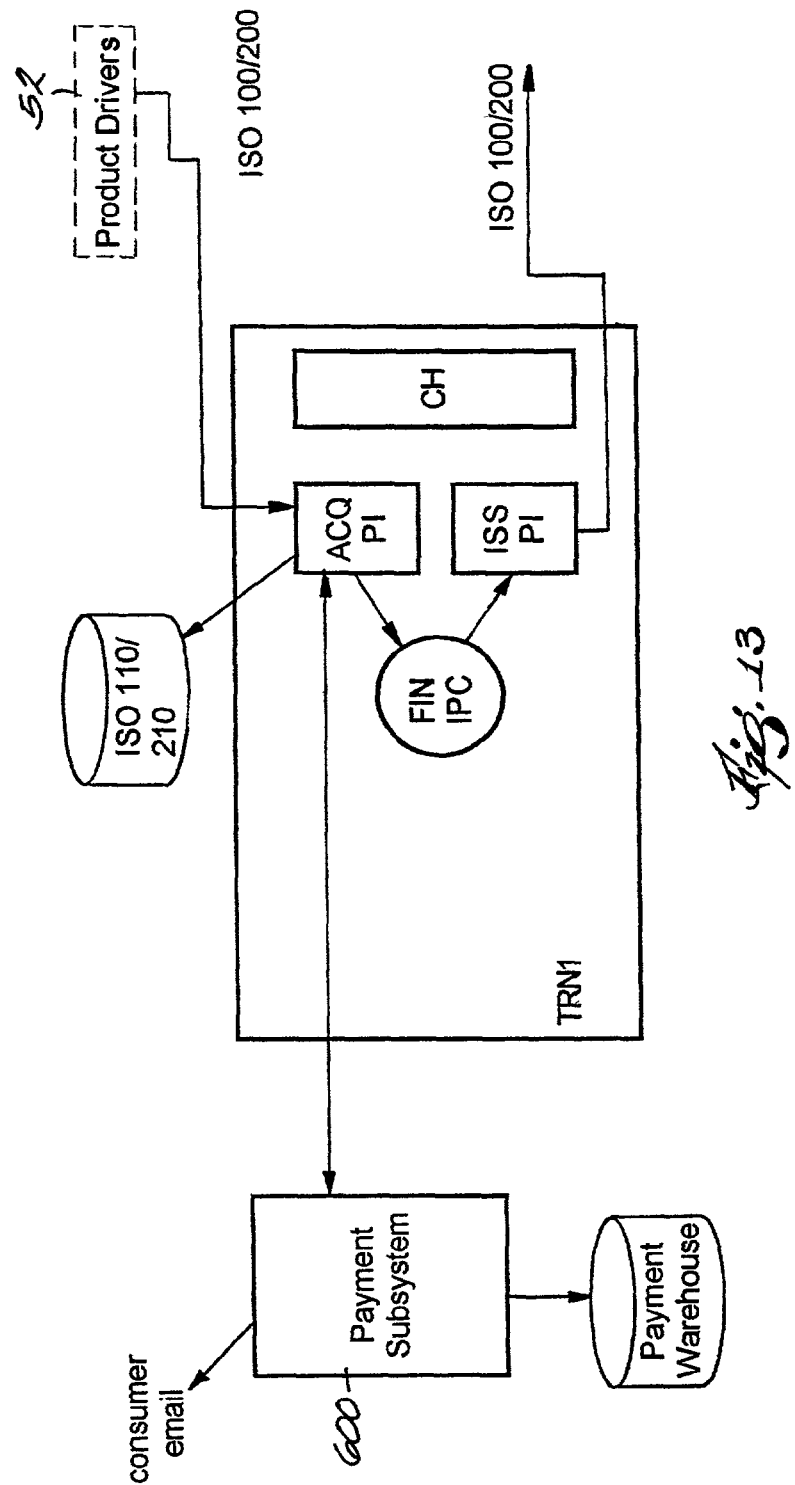
FIG. 13 is a diagram of a payment portal embodiment of the invention.

As noted above, the system 30 may be configured such that consumers may link to the authorization computer 36 at the time of choosing an electronic payment option. When so configured, the system 30 relieves the merchant from having to manage consumer check payment information. The payment portal model may be implemented by constructing a payment portal web site (not shown) with a consumer authentication mechanism (e.g., ID/password, digital certificates, etc.) hosted on the authorization computer 36 or other computer operated by the system operator. Preferably, data from the portal web site is stored in a payment subsystem 600 (FIG. 13). The payment subsystem houses confidential consumer payment information.

When the system 30 is configured with a payment portal web site, a consumer selects an electronic check payment option on the merchant's web site and places his or her order. Control of the transaction is then transferred to the payment portal. The consumer logs on, enters an identification ("ID"), a password (or other authentication device), check related information, and verification data (driver's license number, social security number, etc.). The information the consumer enters in the payment portal is the same information that was entered in the embodiment described above. Other identity verification data is similarly passed from the merchant's site so that the consumer is not required to reenter it. The payment portal web site initiates an electronic check transaction via an interface, such as the XML interface or the Java interface discussed above. The electronic check transaction is processed as was discussed above, with the exception of passing through the payment subsystem on its way through the transaction switch 158. The payment subsystem adds the consumer's payment information to its secure database and optionally sends the consumer an electronic message regarding the payment.

Figure 14:
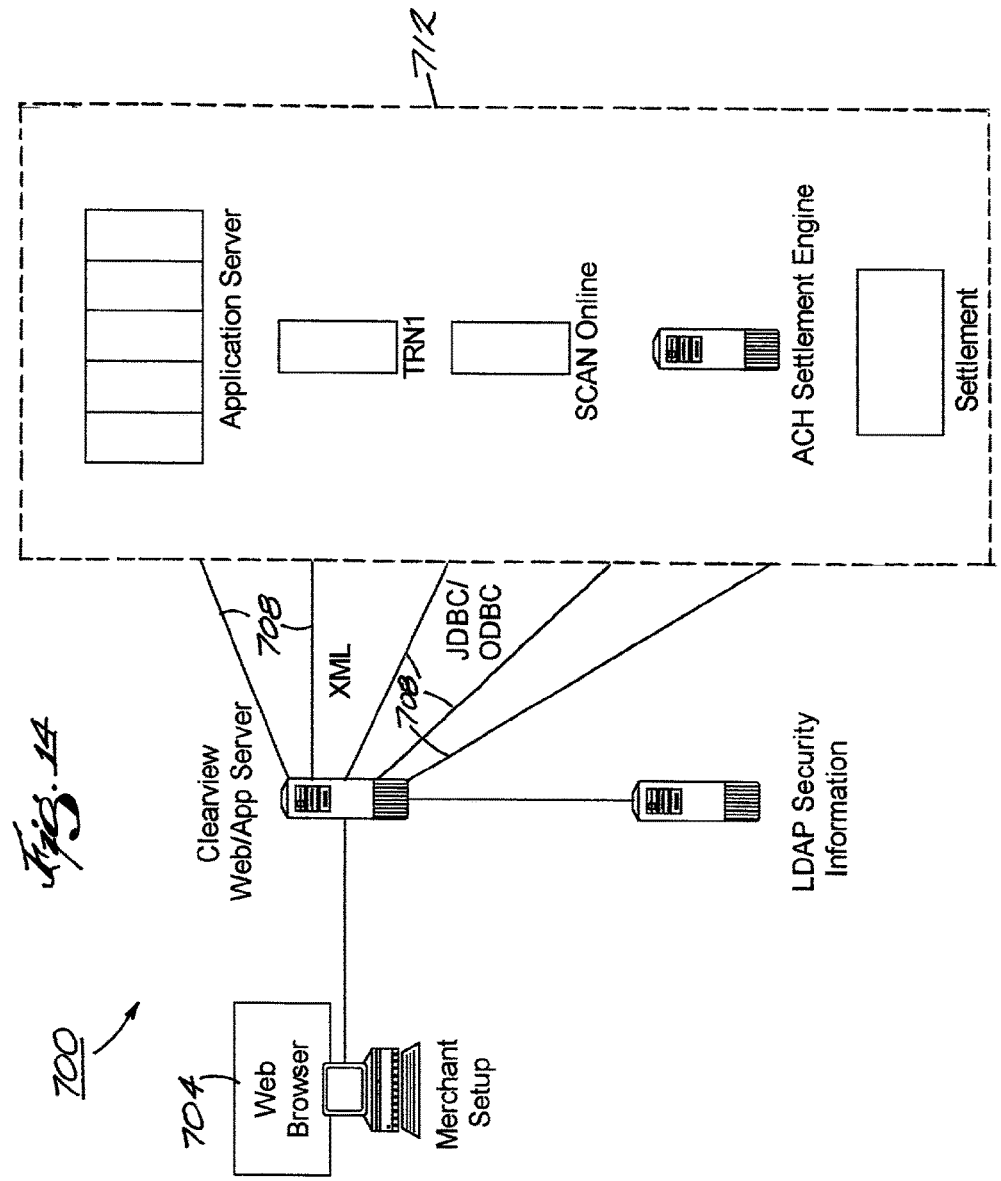
FIG. 14 is a diagram of setup and administrative activities performed in the invention.

In real world applications, the system 30 requires a certain amount of setup and administration. Merchant setup may be done in the product driver layer 52, at the SCAN server 160, at the ACH settlement engine 165, and at the settlement server 156 and done via different user interfaces. Although manual site-by-site setup and administration is possible, it is preferable that the system 30 include a network-enabled, secure setup system 700 (FIG. 14). The setup system 700 includes a web-enabled interface 704 on the merchant computer 34. The setup system also includes JDBC/ODBC and XML connectors 708 to back end subsystems 712 for actual inquiries and updates.

Figure 15:
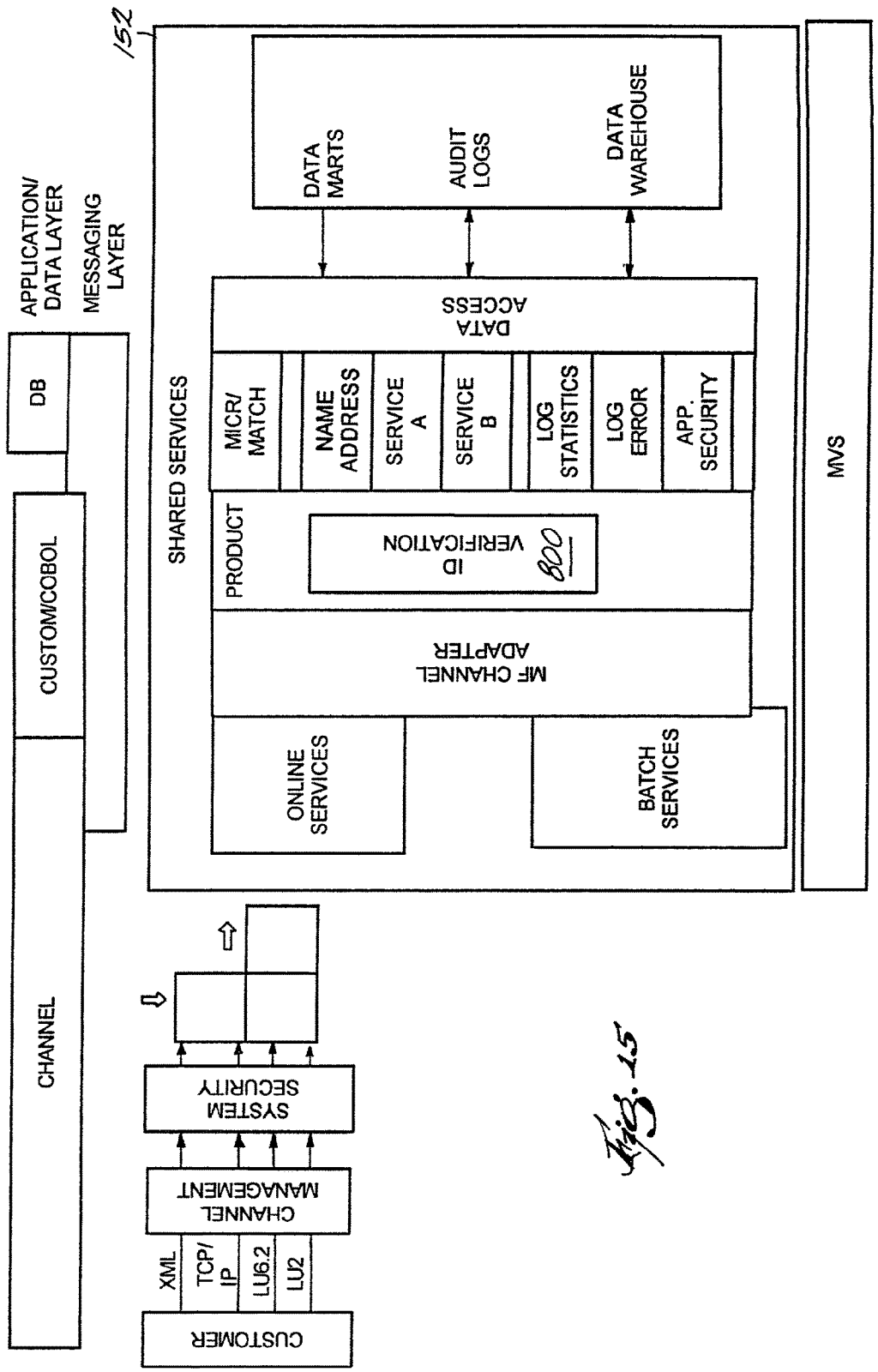
FIG. 15 is a diagram illustrating the architecture of an identification verification module.

As mentioned above, identity verification is one of the functions performed and services provided by the system 30. In other embodiments, identify verification is used for verifying the identity of consumers in systems utilized by electronic bill payment and presentment providers, consumer to consumer/person to person ("C2C/P2P") payment providers, Internet ACH provider applications, payment gateway providers, Internet service provider ("ISP") registration and enrollment applications, non-traditional financial service organizations (e.g., brokerage account opening, initial funding, recurring funding, immediate trade decisioning, credit card payment receipt, insurance company Internet payment receipt and setup, etc.), retail banks (e.g., account opening and enrollment), governmental agencies, remarketers, and any other business that routinely accepts debit payments and is vulnerable to online fraud by consumers. Essentially, identity verification allows a merchant to determine if the consumer is "who they say they are." Preferably, as illustrated in FIG. 15, identity verification is performed by an identity verification module 800 (similar to identity verification module 72) on the application server 152. The identity verification module 800 uses consumer identification debit data elements, such as the consumer's name, address (current and previous), date of birth (DOB), phone (home and work) number, driver's license ("DL") number, MICR number and SSN to validate that the identity information provided by the consumer has previously been associated with the consumer name. The data is analyzed across broad based databases such as the DebitBureau® database owned by eFunds Corporation, Milwaukee, Wis.; the ChexSystems$^{SM}$ database, the SCAN$^{SM}$ database, check printing databases, and additional data sources.

The identity verification module 800 performs a number of searches to uncover inconsistencies in consumer identity data that may indicate fraud. The searches can be categorized as fraud indicator searches and consumer identity validation searches. Fraud searches attempt to identify consumers that are either trying to use an identity that is not their own or an identity that is not completely representative of who they are (i.e., the consumer hides certain facts that would otherwise cause a merchant to reject acceptance of the transaction). Consumer identity validation searches attempt to determine if the information provided by the consumer has been associated with that consumer in the past. A negative result does not necessarily correlate to a fraudulent transaction. However, as the number of discrepancies increases, so does the likelihood of fraud. The identity verification module 800 takes these discrepancies into account as discussed below. In one embodiment, the two categories of searches are performed using two representative filters.

The identity verification module 800 may utilize the first of the two filters to perform fraud indicator searches. Fraud indicator searches may include validation procedures on phone number information (the area code and prefix are compared against a valid list of area code prefix combinations; the standard and extended lists of phone types of the associated area code/prefix are returned when the area code/prefix is not identified as a plain old telephone service ("POTS") number), phone to zip code information (the area code and prefix of the home phone number are compared to the zip code associated with the billing address), DOB to SSN date of issuance ("DOI") information (the input DOB is compared to the DOI returned from a successful match to the SSN), address to warm address information (the billing address and ship to address are compared against a table of addresses identified as non-residential, non-locations, i.e., mailboxes, prisons, vacant lots, etc.), and the like.

The identification verification module 800 may utilize the second of the two filters to perform consumer identity validation searches. Consumer identity validation searches may include validation procedures on DL within state (the format of the input DL is compared to the valid format for the given state, the input DL may then be compared to Department of Motor Vehicles ("DMV") files for a hard match if the service is available in the state), SSN/individual taxpayer identification number ("ITIN") (the input SSN or ITIN is compared to the Social Security Administration valid and/or issued social security groups as well as compared to SSN/ITIN identified as deceased or bogus), DL DOB to SSN DOI (the DOB returned from a successful match to the DL on DMV files is compared to the DOI returned from a successful match to the SSN if the input DOB is different that the DL DOB), DOB to DL DOB (the input DOB is compared to the DOB returned from a successful match to the DL on DMV files). Consumer identity validation searches may also include validation procedures on the consumer's name. An input name may be compared against a consumer search table of standardized names returning the standardized name. The standardized name will be used in the subsequent matching of name to DL, name to consumer address, name to SSN, name to phone and name to MICR. A candidate key, based on a fuzzy match algorithm, may also be used in the subsequent matching of name to DL, name to consumer address, name to SSN, name to phone and name to MICR. Validation procedures may also be performed on a consumer's address to zip code (the consumer address state, city, and zip code are compared within identified geographical identifiers and are standardized; invalid zip codes are corrected in cases where the address, city and state combination is valid as well as a valid postal city name supplied when the zip code and address match within the state); name and address (associations between the name and the billing address are searched using the name and address candidate key); name and DL (associations between the standardized name and the input DL are matched against a cross reference name to DL to identify if prior associations can be found returning the number of sources that were found); name and SSN (the candidate key from the name search and the input SSN or ITIN is matched against a cross-reference candidate key to SSN to identify if prior associations can be found returning the number of sources that were found); name and phone (the candidate key from the name search and the input home or work phone is matched against a cross-reference candidate key to phone numbers to identify if prior associations can be found returning the number of sources that were found); name and MICR (the candidate key from the name search and the input MICR is matched against a cross-reference candidate key to MICR (bank code plus demand deposit account ("DDA") account number) to identify if prior associations can be found returning the number of sources that were found); name and address and DOB (the name, address and DOB are compared against each other for a match); MICR and phone (the MICR and phone are compared against each other for a match); MICR and address (the MICR and address are compared against each other for a match); name and address and phone (the name, address and phone are compared against each other for a match), etc.

The identification verification module 800 may perform validation procedures on other data fields and/or other combinations of data fields as desired. Typically, the merchant assists in defining what validation procedures are to be performed. The decision as to what validation procedures are to be performed may depend upon what type of information is generally collected. For example, if the SSN is rarely received, a search to validate the SSN is not performed. For each validation procedure performed, an output value is returned. The output value may include a "blank" meaning the validation procedure was not performed, an "N" meaning the validation procedure was not successful, a "Y" meaning the validation procedure was successful, an "E" meaning there was a system error, and/or other messages indicating to the consumer and/or the merchant that additional information needs to be provided or that particular results were obtained.

An identity verification score is generated, when applicable, based on validation procedure results. In one embodiment, the output values are mapped against a standard product decision model. The identity verification module 800 weights each response based on the likelihood of fraud and an aggregate score is compiled. The aggregate score is returned to the merchant along with reason codes that support how the scoring was derived for that particular transaction. A threshold level (based on the likelihood of fraud for the merchant's particular industry) is recommended for each merchant based upon industry classification and known fraud profiles. The recommended thresholds can be tiered as aggressive, median, and conservative based upon the merchant's acceptable level of risk (e.g., for a given merchant aggressive=500, median=400 and conservative=300 with a predictive score=450). A merchant that is postured as aggressive in preventing fraud may decide to decline a particular transaction. Alternatively, a business postured as median or conservative may accept the same transaction that was declined by the aggressive merchant. Individual merchants may decide which posture is best for them. In practice, an aggressive merchant may experience more "false positives" than conservative merchants, and conservative merchants may assume more risk of fraud than aggressive merchants. Scores for transactions that exceed the threshold level may proceed to other modules of the system. Scores for transactions that fail to exceed the scoring threshold are returned to the merchant for notification of the consumer.

Based upon the merchant's unique set of business rules, identity verification can be optionally setup to auto-accept or auto-decline certain transactions. An example is where a certain merchant does not want to accept a transaction if a warm address is identified regardless of the overall score for the transaction. Alternatively, the transaction can be set aside for further review if the merchant so desires. Similarly, the score and the decided threshold can serve as a decision driver to auto-accept or auto-decline a transaction. Any combination of output elements, and/or scoring parameters can drive the decision filter to accept, decline, or review a decision.

Figure 16:
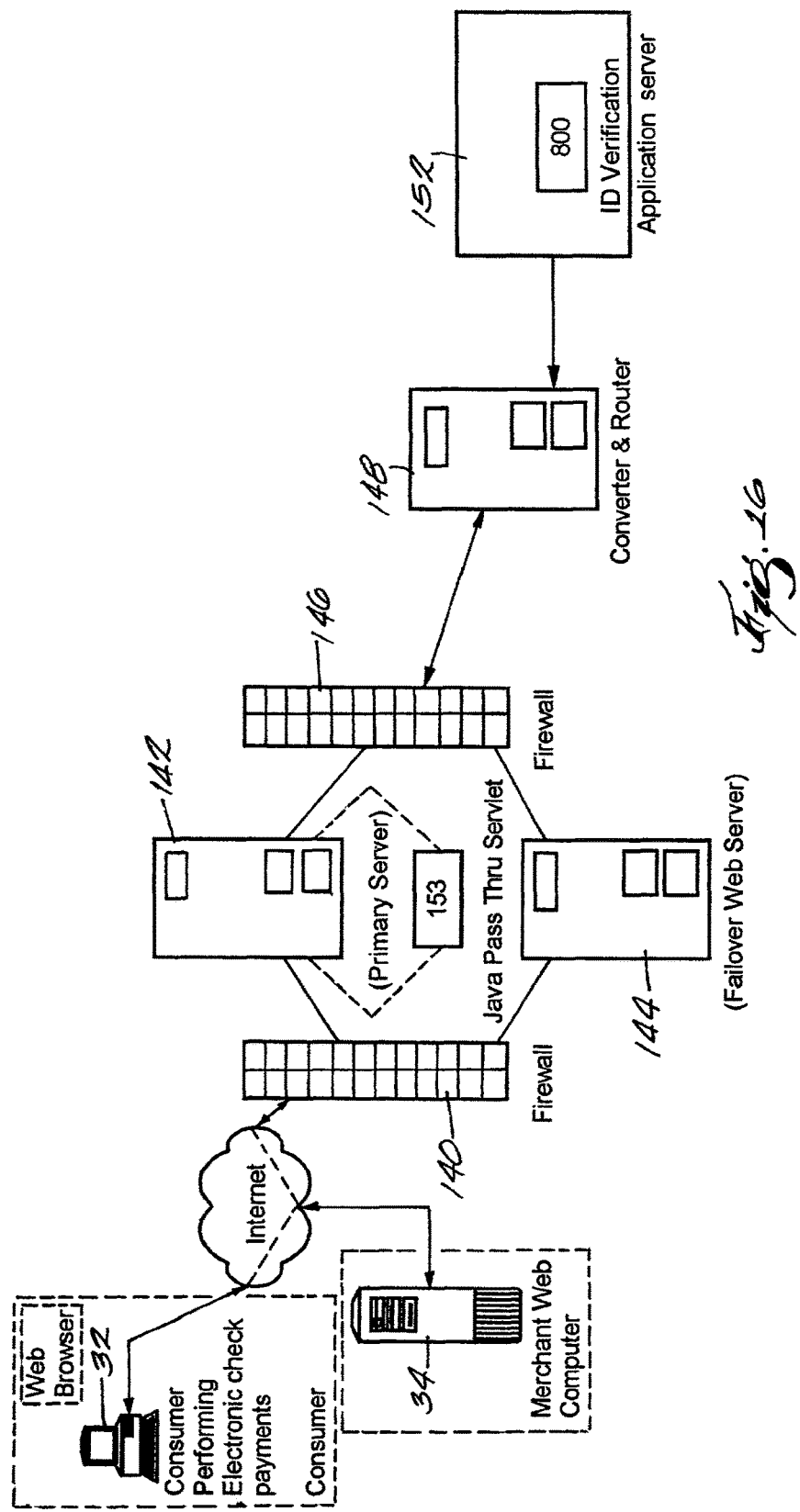
FIG. 16 is a schematic diagram illustrating communication among components during an identification verification process.

The operation of the identification module 800 is illustrated in more detail in FIG. 16. A consumer browses a merchant's web site and decides to open a new account, purchase a product or service, or perform any other activity that requires verification of the consumer's identity. The consumer then enters information as discussed above. XML messages from the consumer terminal 32 are delivered via TCP/IP to the application server 152. The procedures described above are performed and results of the validation procedures for the particular transaction are generated. The results are returned to the merchant computer 34 in the form of binary match results content. The content is formatted in "per match" XML tags. Transaction level and summary level management reports are delivered in ASCII text for ease of manipulation via encrypted e-mail messages to the merchant computer 34. The results of the identification verification module are forwarded from the merchant computer 34 to the consumer terminal 32. If the results indicate a potentially fraudulent transaction, the transaction is denied and the consumer has to reenter correct information, choose another form of payment, or abandon the purchase.

In addition to providing electronic check and identity verification functions, the system 30 also provides a debit data validation function. Debit data validation involves checking or ensuring that a consumer is associated with debit data that is representative of the consumer's own, and only the consumer's own, debit worthiness. Not only does the entity that is contemplating the acceptance of a debit transaction (e.g., a merchant) desire to have an accurate debit worthiness picture of the consumer, but the consumer generally also desires to have their debit worthiness portrayed as it actually is (this may not be the case if the consumer is attempting to perpetrate a fraud on the entity accepting a debit transaction or if the consumer has a poor debit worthiness and would still like to proceed with a debit transaction). The debit data validation function of the invention allows the consumer to be confident that the information provided to the entity attempting to validate debit data is accurate, the financial institutions and retailers to be confident that they are providing products and/or services to a worthy consumer, and the financial institutions and retailers to be better protected from perpetrators of fraud. If debit data for different consumers is mixed or is incorrectly associated with a consumer, the probability of making improper debit decisions increases significantly.

Figure 17:
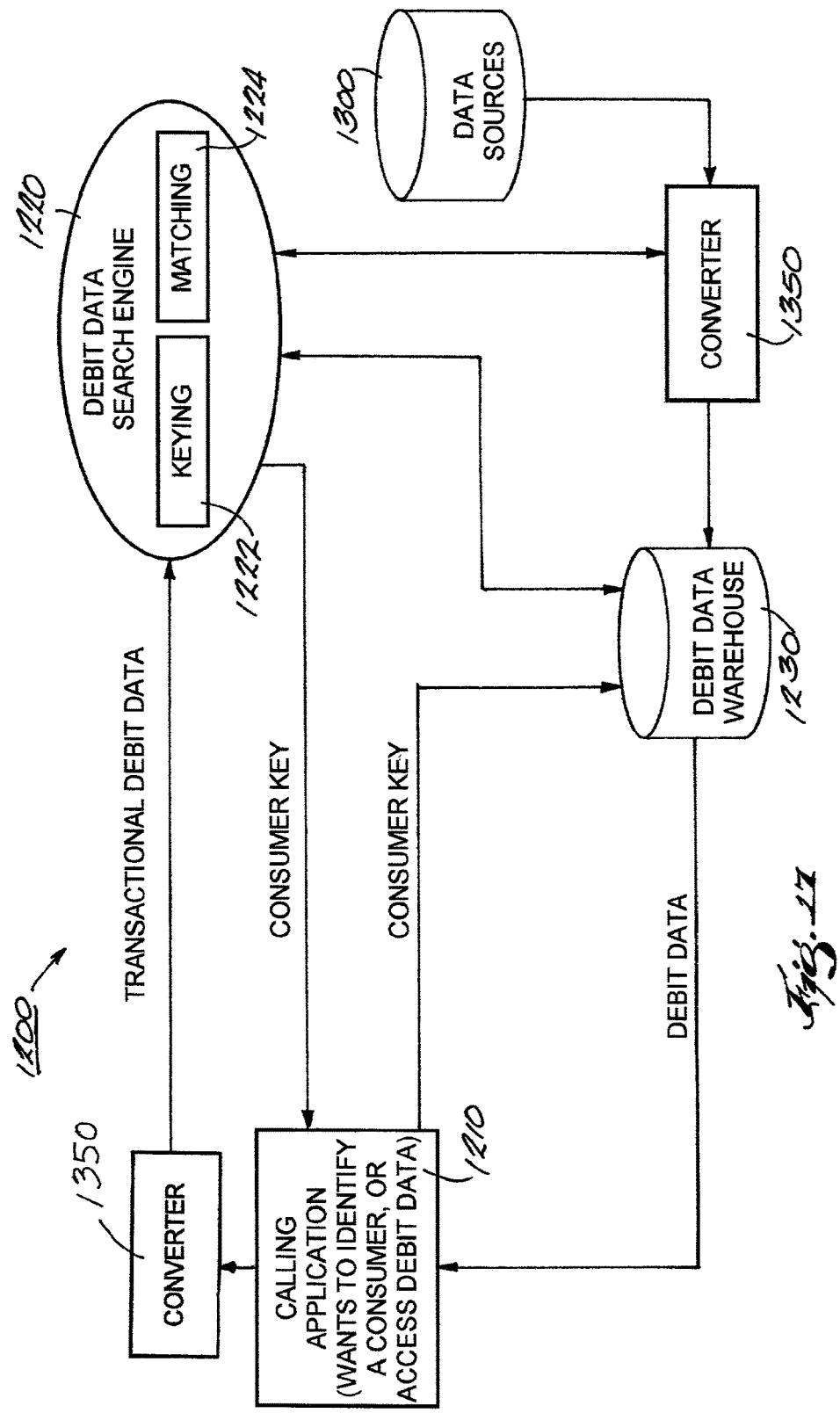
FIG. 17 is a schematic diagram of communications among components during a debit data search.

The process of validating debit data is accomplished by a debit data subsystem 1200 as illustrated in FIG. 17. In one embodiment, the debit data subsystem 1200 is incorporated in a system similar to the system 30 discussed above. The debit data validation function can be used separately from, or in any combination with, the electronic check and the identity verification functions discussed above. The debit data validation function can also be used in conjunction with other products and services where debit data needs to be validated. The debit data subsystem 1200 includes a calling application 1210 that may reside on the application server 152. The calling application 1210 may interact with a debit data search engine 1220 and a debit data warehouse 1230 of the debit data subsystem 1200. The debit data search engine 1220 may include a keying module 1222 and a matching module 1224 for performing keying and matching processes, respectively, as discussed below.

The debit data validation function includes a keying process and a matching process. Generally, the keying process must be completed before the matching process is initiated. The keying module 1222 of the debit data search engine 1220 is utilized along with a converter 1350 to perform the keying process. In one embodiment, the keying process involves three major components including a standardization component, a validation component, and a matching component.

The keying process links debit data (e.g., debit data representative of consumers) acquired from a number of data sources 1300 together. The debit data acquired from the data sources 1300 is linked together to form at least one consumer key or consumer identifier. A portion of the consumer key can be used as a partitioning key for determining the physical partition the data is located in. Consumer keys are commonly identified by either a name or an address. Alternatively, consumer keys can be identified by any data attribute representative of the consumer. Each consumer key may represent the overall debit worthiness picture of a particular consumer which is based only upon reliable debit data acquired from the data sources 1300. Although debit data from multiple data sources 1300 is linked, any data source 1300 that does not include at least two of the required data attributes for a particular consumer may not contribute to the debit data warehouse 1230. At least two of the required attributes are necessary to ensure that the debit data provided has a high likelihood of being representative of the particular consumer. The keying process generally includes a more stringent standard than the standard used for the matching process because once debit data is linked together to form a consumer key, the permanency of the consumer key is difficult to overturn.

The debit data subsystem 1200 increases the robustness of the debit data validation function by linking debit data from the data sources 1300 (e.g., financial, retail, and debit) to form the consumer keys. Debit data from the data sources 1300 may include data about checking account and savings account openings and closings, checking account collections data, overdraft histories, check order histories, returned check transactions, check printing orders, account inquiries, retail transactions, ATM transactions, ACH transactions, Internet transactions, and other transactions that provide debit data. Attributes associated with the consumer such as the consumer's name, address, SSN, DL information, bank account number, phone number, and others are obtained from this data. For example, a returned check transaction may provide a consumer's MICR and DL number; a check printing transaction may provide the consumer's name, address, MICR, and DL number; and an account inquiry may provide the consumer's name, address, and SSN. Although large amounts of debit data can increase the robustness of the debit data validation function, the debit data must be organized in the debit data warehouse 1230 in a useful fashion for this increased robustness to be realized.

The debit data subsystem 1200 processes and organizes the debit data from the data sources 1300 into the consumer keys that are stored in the debit data warehouse 1230. In one embodiment, debit data that is not utilized in generating a consumer key may also be stored in the debit data warehouse 1230 according to a data model defining the structure of the database.

The standardization component of the keying process includes standardizing all debit data into a consistent format. The consistent format assists in developing a debit data warehouse 1230 which allows for efficient searching and storing of the data attributes. The standardization process may be performed by the rules and formatter application 149 in a fashion similar to the rules and formatting steps discussed above. In one embodiment, the converter 1350 is similar to the rules and formatter application 149. Edits made in the conversion process are applied against the data fields. Data fields that fail the edits may be left blank. Alternatively, the entire record may be rejected.

The validation process includes checking data against existing reference files to detect incorrect or bad data. Each data element value is compared against acceptable edit masks and allowable values to ensure only acceptable data passes to the matching component of the keying process. Data elements that do not pass each validation step may be left blank or alternatively rejected.

The matching component includes matching debit data from the data sources 1300 (i.e., acquired debit data) against the debit data stored in the debit data warehouse 1230 (i.e., stored debit data). The matching component determines what acquired debit data can be linked to the stored debit data. The stored debit data is preferably already linked together by a consumer key. The debit data search engine 1220 performs the processing for the matching component. As illustrated in FIG. 17, the debit data search engine 1220 is coupled to the converter 1350 and the debit data warehouse 1230.

If a match is found between the acquired debit data and the stored debit data, then the acquired debit data is additionally linked to the consumer key that is representative of the matched stored debit data. Linking all debit data available about a consumer together assists in developing a complete picture of the debit worthiness of the consumer. If the acquired debit data indicates that a data attribute for the consumer has changed (e.g., consumer moved to a new location), the consumer key may be altered if the acquired debit data is determined to be reliable and representative of the particular consumer the consumer key represents. As discussed above, because of the difficulty associated with breaking a consumer key, a stringent matching standard is utilized. Typically, all available data attributes are analyzed to determine if a proper match can be accomplished. If the change in information results in a "no match" condition, then a new consumer key is generated just as if no stored debit data representative of the consumer existed. Therefore, in one embodiment, more than one consumer key can exist that is representative of a certain consumer. Ideally, the consumer key that links the most up-to-date debit data is utilized to validate debit data. More than one consumer key may link similar and/or identical debit data elements. The debit data subsystem 1200 may include a deleter adapted to delete consumer keys that are not utilized for a threshold amount of time if memory requirements necessitate such deletion. If no match is found between the acquired debit data and the stored debit data, a new consumer key may be generated.

Once the acquired debit data is linked to an existing or a new consumer key, the debit data is stored in the debit data warehouse 1230. The debit data warehouse 1230 is organized to provide efficient access to the debit data using any combination of the attributes. The debit data warehouse 1230 uses relational technology and creates indexes of each of the data attributes. Such a design allows for addition or deletion of data attributes at any time. If the data sources 1300 are able to provide debit data that includes additional data attributes representative of the consumer the overall debit worthiness picture of the consumer can be expanded. This allows for more efficient validation of debit data. Similarly, if a data attribute is determined to be unreliable or highly associated with fraudulent transactions, the data attribute can be removed from the debit data warehouse 1230.

The converter 1350 may also perform parsing. Parsing may be utilized to break a single name and/or addresses data field into a number of data fields representative of specific components of the name and/or address (e.g., name parsed into last name, first name, and middle name or initial). Parsing may also correct some address information.

The converter 1350 may also perform bursting. Bursting refers to the process of separating a joint account name into two individual names (e.g., John and Jane Doe into John Doe and Jane Doe). Bursting may allow for a more accurate debit worthiness picture for each of the individuals named in a joint account to be determined.

The converter 1350 may also include a geographic coder. The geographic coder is adapted to correct street names, cities, states, zip codes, and similar types of information as part of the process of converting acquired debit data into stored debit data. For example, the converter may determine that based on all of the address information provided, the zip code should be 54002 instead of 54020. The geographic coder may be used on data fields that are parsed.

Once the keying process is completed, the matching process can be initiated. The keying process is actually an ongoing process which is run every time debit data is acquired from at least one of the debit sources. In one embodiment, debit data may be acquired from each of the data sources 1300 on a periodic basis (e.g., daily, weekly, monthly). The matching process may involve three major components including a standardization component, a validation component, and a matching component. The standardization component and the validation component of the matching process are similar to the standardization component and the validation component of the keying process discussed above.

The matching process attempts to match debit data from a particular transaction (i.e., transactional debit data) with stored debit data (i.e., consumer key). The transactional debit data may include the debit data entered by the consumer as discussed above, or it may include debit data entered by the entity requesting validation of debit data. The matching process may be initiated by a merchant using the merchant computer 34, or by other entities interested in validating debit data. The matching process can be utilized to identify "who a consumer is" (i.e., retrieve additional information about the consumer) based upon information the merchant has (e.g., the merchant may only have limited information about a consumer which may or may not include their name), or the merchant may simply desire to access debit data for a consumer that is already known (i.e., the merchant wants to determine what the overall debit worthiness picture of the consumer looks like before proceeding with certain business transactions).

There are numerous challenges associated with the matching process that relate to idiosyncrasies in base data. These idiosyncrasies include the use of slightly different names (e.g., Chris and Christopher) and slightly different addresses (e.g., 231 State Street and 231 State St., Apt. #1B); mistyped or out of position information (e.g., 524 Main Street and 542 Mani Street); and changes in name (e.g., a person gets married and changes their last name), address (e.g., a person moves to a new location), checking account, credit card, and driver's license information. An additional problem relates to the ever increasing existence of intentional identity fraud. In order to provide reliable validation of debit data, the inventors have determined that the validation process needs to account for these problems. Further, the validation process should assist the entity attempting to validate debit data in determining what consumers are likely fraudulent, but the validation process should not penalize consumers for mistyping information or entering their name as Chris instead of Christopher (i.e., a balance has to be made between security and false positives). As discussed above with respect to the identity verification function, the balance between security and consumer service is determined based upon the business requirements of the entity. The matching strategies employed by the validation process of the invention allows for such reliability in matching debit data.

The matching process is initiated when an entity provides transactional debit data to the calling application 1210. A data stream of the transactional debit data is sent to the authorization computer 36 for processing as discussed above. The calling application 1210 then provides the transactional debit data to the debit data search engine 1220. Transactional debit data can be provided as a single request or as a batch request. The debit data search engine 1220 attempts to match the transactional debit data to a consumer key that is representative of the consumer. If a consumer key exists that accurately represents the consumer which the calling application 1210 is attempting to identify, the located consumer key is delivered to the calling application 1210. The consumer key is then sent to the debit data warehouse 1230 and all of the debit data linked by the consumer key is sent to the calling application 1210. In one embodiment, the debit data is automatically sent to the calling application 1210 when a consumer key is located. The calling application 1210 can then review the overall debit worthiness picture of the consumer and determine whether or not to allow a debit transaction.

Figure 18:
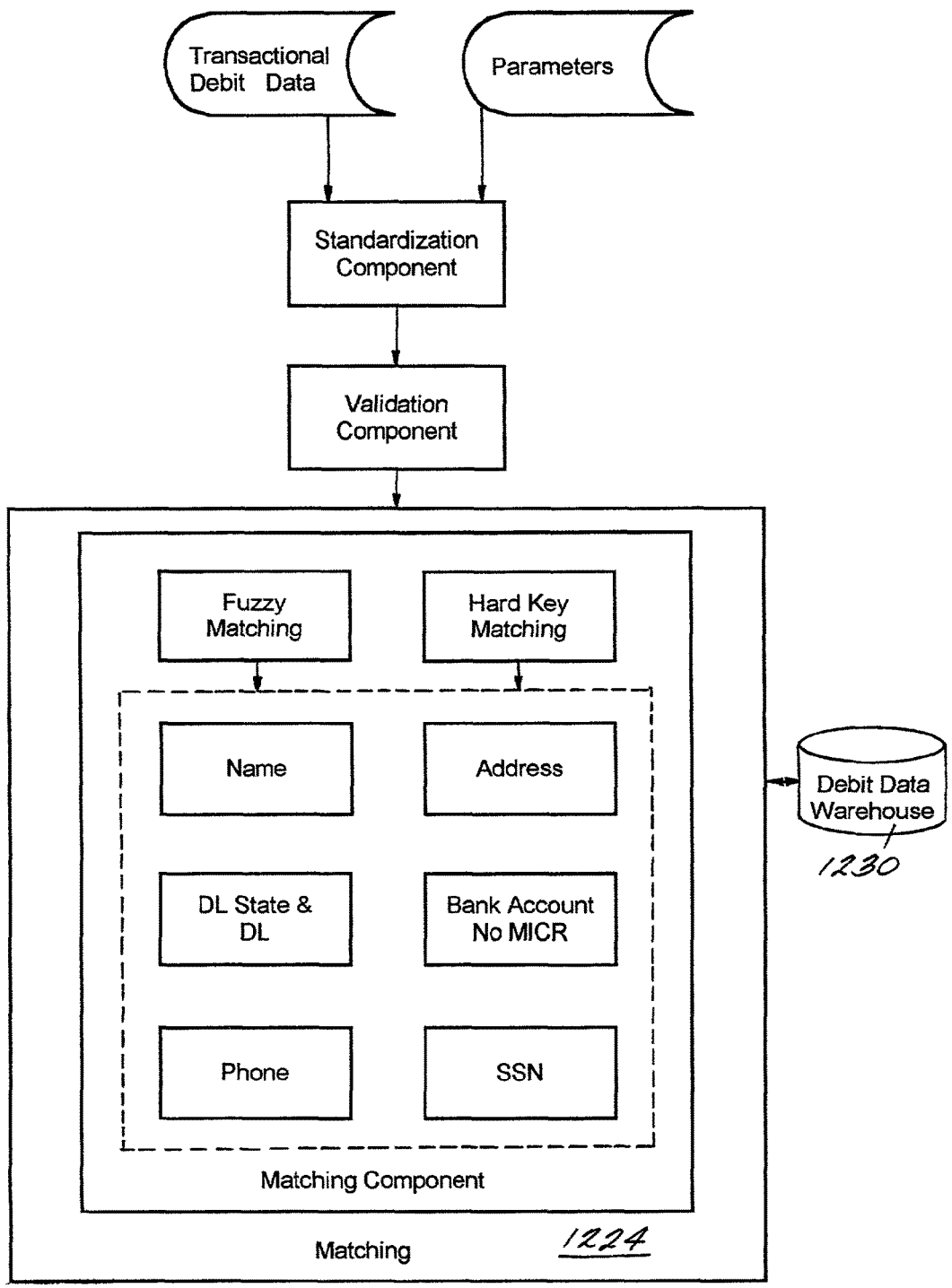
FIG. 18 is a flow chart illustrating the steps involved in a debit data search.

The matching process is illustrated in FIG. 18. The matching module 1224 of the debit data search engine 1220 performs matching. In one embodiment, the matching module 1224 performs name/address searches, name/previous address searches, name/DL searches, name/phone searches, name/MICR searches, MICR/phone searches, and MICR/address searches. The matching process is flexible and may allow for matching based on other data attribute combinations. The entity requesting validation of debit data has the ability to specify which searches it would like performed. The parameters can also specify the order of the searches to be performed. The parameters are submitted to the calling application 1210 along with the data stream. In an alternative embodiment, the parameters can be setup for the entity and utilized whenever the entity submits debit data to be validated. The ability to adjust the parameters allows the entity to specify what searches and what order of searches are optimal for a given transaction. For example, some transactions may receive the SSN only 10% of the time. It is not optimal to perform a SSN search in such a situation. However, if a type of transaction always receives the SSN, a SSN search might be the first search attempted.

The flexibility of the searches and the number of searches that can be performed by the matching module 1224 allows for more stringent standards to be utilized in matching data than if only limited searches were available. For example, if the matching module 1224 only utilized searches related to the consumer's name and address including name/address1 searches, name/address2 searches, and name/address3 searches, then errors could occur when attempting to validate debit data. If John Doe lived at an address with apartment number 1A, a match would be made for John Doe at that address regardless of what apartment John Doe the consumer lives in. This situation does not present a problem unless a second John Doe moves into the first John Doe's apartment building. When this occurs, the results of the matching process may return improper results (if the second John Doe has a little or no debit worthiness, the first John Doe could be declined a debit transaction). In one embodiment, the matching module 1224 of the invention uses a more stringent matching standard including matching down to the apartment number level (i.e., if two consumers with the name John Doe live in the same apartment building, the matching module 1224 differentiates between the two consumers by using all available address fields so that improper results are not produced.

The debit data search engine can use two types of matching: fuzzy matching and hardkey matching. Fuzzy matching compensates for variations in names (e.g., Bob, Robert, Rob), variations in spellings (e.g., Chris, Kris), and misspellings (Maple, Mapel). Fuzzy matching allows for the adjustment of matching parameters to make the matching process more or less stringent. As discussed, the matching parameters may be provided by the entity requesting validation of debit data. Hardkey matching searches for the exact characters with no variation. When using a hardkey matching search, a last name and phone match does not allow for any variation in the last name or the phone number. These same matching strategies can be utilized in the matching component of the linking process, although it is preferred to utilize the hardkey matching when performing the linking process.

As can be seen from the above, the invention provides, among other things, a method and system of debit-based electronic payment with authenticity and verification capabilities. Various features and advantages of the invention are set forth in the following claims.

What is claimed is:

1. A computer-implemented method, implemented by at least one hardware processor, comprising:
   receiving, by an electronic processing system from a user terminal via a direct link in an electronic communications network, check data including at least one of raw MICR data and parsed MICR data associated with a user;
   receiving, by the electronic processing system, from a merchant computer system bypassing the direct link, via the electronic communications network, consumer-entered transactional debit data, merchant transactional debit data, and a digital certificate;
   formatting the check data, the consumer-entered transactional debit data, and the merchant transactional debit data in association with generating a transaction, and routing the formatted data to an application server of the electronic processing system;
   verifying that at least one of a session, a data capture procedure, or a data storage procedure of the merchant computer system meets a preset security level based on the digital certificate;
   based on the verifying, automatically calling, by the application server, at least one application to process the consumer-entered transactional debit data, and the merchant transactional debit data, to effect an electronic check transaction, at least in part, by:
      accessing historical check activity information stored in a database and determining whether to accept the check data based on analyzing the historical check activity information, the historical check activity information comprising information about at least one of closed accounts, stop payments, uncollected funds, deceased payees, frozen accounts, and high-risk consumers;
      receiving, from the merchant computer system, a set of search parameters;
      executing one or more searches associated with the merchant computer system, among a plurality of consumer keys stored in the database, utilizing the set of search parameters, wherein at least a data attribute to be searched or an order of the one or more searches are determined based on the set of search parameters;
      matching the merchant transactional debit data to a consumer key associated with debit data representative of the user;
      linking the consumer-entered transactional debit data and the merchant transactional debit data to the consumer key associated with the debit data representative of the user;
      updating the consumer key based on the consumer-entered transactional debit data and the merchant transactional debit data; and
      determining debit worthiness of the user based on the updated consumer key;
   generating, by the application server, a response indicative of acceptance or declination of the electronic check transaction, at least in part, based on the analyzing of the historical check activity information and the debit worthiness of the user;
   matching the response with the consumer-entered transactional debit data;
   logging the matched response and the consumer-entered transactional debit data; and
   responsive to accepting the check data,
      transmitting an instruction to an automated clearinghouse (ACH) system, over the electronic communications network, the instruction causing the ACH system to initiate a fund transfer, and
      updating the historical check activity information stored in the database with the logging information.

2. The computer-implemented method of claim 1, wherein receiving the check data further comprises:
   receiving an image of a paper check; and
   scanning the image of the paper check in association with collecting raw MICR data associated with the paper check.

3. The computer-implemented method of claim 1, further comprising:

receiving, from the merchant computer system via the electronic communications network, a merchant-entered indication that the consumer wishes to pay via a check; and receiving, from the user terminal via the electronic communications network, at least one of consumer-entered identification data, consumer-entered check information, and consumer-entered verification data.

4. The computer-implemented method of claim 1, further comprising:

receiving at least one of the consumer-entered identification, consumer-entered check information, and consumer-entered verification data from a portal system over the electronic communications network.

5. The computer-implemented method of claim 1, further comprising:

sending the response indicative of acceptance or declination of the electronic check transaction to the merchant computer over the electronic communications network.

6. The computer-implemented method of claim 1, wherein the merchant transactional debit data includes at least one of order data and consumer data.

7. The computer-implemented method of claim 1, wherein the consumer-entered transactional debit data includes at least one of consumer data and check data.

8. The computer-implemented method of claim 1, wherein the processing of the check data, the consumer-entered transactional debit data, and the merchant transactional debit data further includes generating a unique identifier for the electronic check transaction.

9. The computer-implemented method of claim 1, wherein the receiving of the check data further comprises:

instructing the user terminal to display a virtual check and one or more dialog boxes appearing in locations representative of placement of the parsed MICR data on a physical check; and receiving information entered by a customer in the one or more dialog boxes.

10. A computer system, comprising:

at least one hardware processor;

an application server comprising at least one application; and storage comprising computer software that when executed by the at least one hardware processor, cause the at least one hardware processor to perform operations comprising:

receiving, from a user terminal via a direct link in an electronic communications network, check data including at least one of raw MICR data and parsed MICR data associated with a user;

receiving, from a merchant computer bypassing the direct link, via the electronic communications network, consumer-entered transactional debit data, merchant transactional debit data, and a digital certificate;

formatting the check data, the consumer-entered transactional debit data, and the merchant transactional debit data in association with generating a transaction, and routing the formatted data to the application server;

verifying that at least one of a session, a data capture procedure, and a data storage procedure of the merchant computer meets a preset security level based on the digital certificate, wherein the application server automatically calls the at least one application to process the check data, the consumer-entered transactional debit data, and the merchant transactional debit data, to effect an electronic check transaction, at least in part, by:

accessing historical check activity information stored in a database and determining whether to accept the check based on historical check activity information, the historical check activity information including information about at least one of closed accounts, stop payments, uncollected funds, deceased payees, frozen accounts, and high-risk consumers;

receiving, from the merchant computer system, a set of search parameters;

executing one or more searches associated with the merchant computer system, among a plurality of consumer keys stored in the database, utilizing the set of search parameters, wherein at least a data attribute to be searched or an order of the one or more searches are determined based on the set of search parameters;

matching the merchant transactional debit data to a consumer key associated with debit data representative of the user;

linking the consumer-entered transactional debit data and the merchant transactional debit data to a consumer key associated with debit data representative of the user;

updating the consumer key based on the consumer-entered transactional debit data and the merchant transactional debit data;

determining debit worthiness of the user based on the updated consumer key; and generating a response indicative of acceptance or declination of the electronic check transaction;

matching the response with the consumer-entered transactional debit data;

logging the matched response and the consumer-entered transactional debit data; and responsive to accepting the check data, transmitting an instruction to an automated clearinghouse (ACH) system over the electronic communications network, the instruction causing the ACH system to initiate a fund transfer; and updating the historical check activity information stored in the database with the logging information.

11. The computer system of claim 10, wherein the receiving of the check data further comprises:

receiving an image of a paper check; and scanning the image of the paper check in association with identifying the raw MICR data.

12. The computer system of claim 10, wherein, the operations further comprise:

receiving, from the merchant computer over the electronic communications network, a merchant-entered indication that the consumer wishes to pay via a check; and receiving, from the user terminal over the electronic communications network, at least one of consumer-entered identification, consumer-entered check information, and consumer-entered verification data.

13. The computer system of claim 10, wherein the operations further comprise:

receiving at least one of the consumer-entered identification, consumer-entered check information, and consumer-entered verification data from a portal system over the electronic communications network.

14. The computer system of claim 10, wherein the operations further comprise:

sending the response indicative of acceptance or declination of the electronic check transaction to the merchant computer over the electronic communications network.

15. The computer system of claim 10, wherein the merchant transactional debit data comprises at least one of order data and consumer data.

16. The computer system of claim 10, wherein the consumer-entered transactional debit data comprises at least one of consumer data and check data.

17. The computer system of claim 10, wherein in the processing of the check data, the consumer-entered transactional debit data, and the merchant transactional debit data, the software is associated with generating a unique identifier for the electronic check transaction.

18. The computer system of claim 10, wherein the receiving of the check data further comprises:
- instructing the user terminal to display a virtual check with one or more dialog boxes appearing in locations representative of placement of the parsed MICR data on a physical check; and
- receiving, as the parsed MICR data, information provided by the user in the one or more dialog boxes.

\* \* \* \* \*